US012592335B2

(12) United States Patent
Ozawa et al.

(10) Patent No.: US 12,592,335 B2

(45) Date of Patent: Mar. 31, 2026

(54) LAMINATED COIL COMPONENT

(71) Applicant: Murata Manufacturing Co., Ltd., Kyoto-fu (JP)

(72) Inventors: Reiji Ozawa, Nagaokakyo (JP); Shoyo Yamada, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 630 days.

(21) Appl. No.: 18/186,720

(22) Filed: Mar. 20, 2023

(65) Prior Publication Data

US 2023/0326660 A1 Oct. 12, 2023

(30) Foreign Application Priority Data

Mar. 30, 2022 (JP) ................................ 2022-056389

(51) Int. Cl.
*H01F 27/28* (2006.01)

(52) U.S. Cl.
CPC . *H01F 27/2804* (2013.01); *H01F 2027/2809* (2013.01)

(58) Field of Classification Search
CPC ......... H01F 27/2804; H01F 2027/2809; H01F 27/292; H01F 2017/002; H01F 17/0013; H01F 27/32; H01F 2017/0073
USPC .......................................... 336/83, 200, 232
See application file for complete search history.

(56) References Cited

U.S. PATENT DOCUMENTS

| | | | | |
|---|---|---|---|---|
| 6,304,164 B1 * | 10/2001 | Ohno | H01F 17/0006 336/200 |
| 6,675,462 B1 * | 1/2004 | Takahashi | H01F 27/292 336/200 |
| 2012/0056705 A1 * | 3/2012 | Kim | H01F 17/0033 336/200 |

FOREIGN PATENT DOCUMENTS

| | | |
|---|---|---|
| JP | 2001-093730 A | 4/2001 |
| JP | 2014-157919 A | 8/2014 |
| JP | 2019-009299 A | 1/2019 |
| WO | 2015/022889 A1 | 2/2015 |

* cited by examiner

*Primary Examiner* — Tuyen T Nguyen
(74) *Attorney, Agent, or Firm* — Studebaker Brackett PLLC

(57) ABSTRACT

A laminated coil component includes an element body including insulating layers laminated in a lamination direction, a coil inside the element body, and an external electrode on a surface of the element body and electrically connected to the coil. The coil includes a coil conductors laminated in the lamination direction and electrically connected via a via conductor penetrating the insulating layer in the lamination direction. The coil conductors include a first laminated portion including three or more of the coil conductors adjacent to each other, a second laminated portion including the coil conductors adjacent to each other such that a number of the coil conductors in the second laminated portion is the same as a number of the coil conductors in the first laminated portion, and an intermediate portion adjacent to and between the first and second laminated portions and including one or two of the coil conductors.

8 Claims, 10 Drawing Sheets

LAMINATED COIL COMPONENT

CROSS-REFERENCE TO RELATED APPLICATION

This application claims benefit of priority to Japanese Patent Application No. 2022-056389, filed Mar. 30, 2022, the entire content of which is incorporated herein by reference.

BACKGROUND

Technical Field

The present disclosure relates to a laminated coil component.

Background Art

Japanese Patent Application Laid-Open No. 2019-9299 discloses a laminated inductor including a laminated body including a plurality of insulating layers laminated in a lamination direction, and a plurality of coil groups arranged in the laminated body along the lamination direction and connected in series, in which the coil group includes a plurality of coil patterns provided on the insulating layer and laminated in the lamination direction, and a plurality of pattern groups including n (n is a positive integer) coil patterns connected in parallel are connected in series. The parallel number n of at least one coil group is different from the parallel number n of other coil groups, a plurality of insulating layers include a magnetic insulating layer and a nonmagnetic insulating layer, and at least one of the insulating layers adjacent to the coil pattern is a nonmagnetic insulating layer.

SUMMARY

FIG. 12A of Japanese Patent Application Laid-Open No. 2019-9299 discloses a laminated inductor configured by connecting, in series, a plurality of pattern groups formed by connecting three coil patterns in parallel. However, as a result of examination by the present inventors, it has been found that a problem below occurs in the laminated inductor illustrated in FIG. 12A of Japanese Patent Application Laid-Open No. 2019-9299.

In the laminated inductor illustrated in FIG. 12A of Japanese Patent Application Laid-Open No. 2019-9299, in a combination of the pattern groups adjacent in a lamination direction, a region where the coil patterns do not overlap each other when viewed from the lamination direction exists for three layers in terms of insulating layers. For this reason, in the laminated inductor illustrated in FIG. 12A of Japanese Patent Application Laid-Open No. 2019-9299, density is likely to locally lowered in the above region, and as a result, a problem that defects such as a crack are likely to occur in the laminated body is generated.

Accordingly, the present disclosure provides a laminated coil component in which defects such as a crack are less likely to occur in an element body.

A laminated coil component of the present disclosure includes an element body formed by a plurality of insulating layers laminated in a lamination direction, a coil provided inside the element body, and an external electrode provided on a surface of the element body and electrically connected to the coil. The coil includes a plurality of coil conductors laminated in the lamination direction electrically connected via a via conductor penetrating the insulating layer in the lamination direction. The plurality of the coil conductors laminated in the lamination direction includes a first laminated portion including three or more of the coil conductors adjacent to each other, a second laminated portion including the coil conductors adjacent to each other that are as many as the coil conductors in the first laminated portion (i.e., a number of the coil conductors in the second laminated portion is the same as the number of the coil conductors in the first laminated portion), and an intermediate portion adjacent to the first laminated portion and the second laminated portion between both of the laminated portions and including one or two of the coil conductors. The first laminated portion has a first parallel section in which all the coil conductors constituting the first laminated portion overlap each other when viewed from the laminated direction. The first parallel sections are connected in parallel by the via conductor. The second laminated portion has a second parallel section in which all the coil conductors constituting the second laminated portion overlap each other when viewed from the laminated direction. The second parallel sections are connected in parallel by the via conductor. The first parallel sections and the second parallel sections overlap each other when viewed from the lamination direction, and all the coil conductors constituting the intermediate portion do not overlap each part of the first parallel sections and the second parallel sections when viewed from the laminated direction.

According to the present disclosure, it is possible to provide a laminated coil component in which defects such as a crack are less likely to occur in an element body.

DETAILED DESCRIPTION

Figure 1:
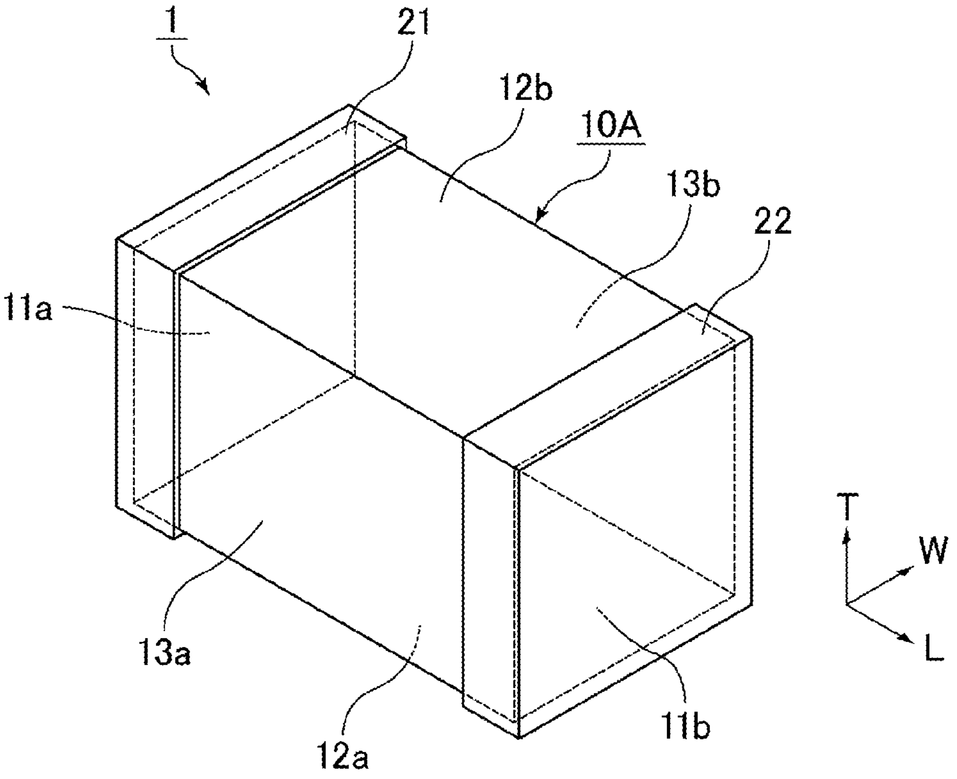
FIG. 1 is a schematic perspective view illustrating an example of a laminated coil component according to a first embodiment of the present disclosure.

Hereinafter, a laminated coil component of the present disclosure will be described. The present disclosure is not limited to a configuration below, and may be modified as appropriate without departing from the gist of the present disclosure. Further, a combination of a plurality of individual preferable configurations described below is also the present disclosure.

It goes without saying that each of the embodiments illustrated below is an example, and partial replacement or combination of configurations illustrated in different embodiments is possible. In a second embodiment and subsequent embodiments, matters common to a first embodiment will not be described, and only a different point will be mainly described. In particular, the same operation and effect by the same configuration will not be sequentially mentioned for each embodiment.

In description below, in a case where the embodiments are not particularly distinguished, they are simply referred to as the "laminated coil component of the present disclosure".

The drawings shown below are schematic views, and dimensions, scales of aspect ratios, and the like may be different from those of an actual product.

A laminated coil component of the present disclosure includes an element body formed by a plurality of insulating layers laminated in a lamination direction, a coil provided inside the element body, and an external electrode provided on a surface of the element body and electrically connected to the coil. The coil includes a plurality of coil conductors laminated in the lamination direction electrically connected via a via conductor penetrating the insulating layer in the lamination direction. The plurality of the coil conductors laminated in the lamination direction includes a first laminated portion including three or more of the coil conductors adjacent to each other, a second laminated portion including the coil conductors adjacent to each other that are as many as the coil conductors in the first laminated portion (i.e., a number of the coil conductors in the second laminated portion is the same as the number of the coil conductors in the first laminated portion), and an intermediate portion adjacent to the first laminated portion and the second laminated portion between both of the laminated portions and including one or two of the coil conductors. The first laminated portion have a first parallel section in which all the coil conductors constituting the first laminated portion overlap each other when viewed from the laminated direction. The first parallel sections are connected in parallel by the via conductor. The second laminated portion have a second parallel section in which all the coil conductors constituting the second laminated portion overlap each other when viewed from the laminated direction. The second parallel sections are connected in parallel by the via conductor. The first parallel sections and the second parallel sections overlap each other when viewed from the lamination direction, and all the coil conductors constituting the intermediate portion do not overlap each part of the first parallel sections and the second parallel sections when viewed from the laminated direction.

First Embodiment

An example of the laminated coil component of the present disclosure will be described as the laminated coil component of the first embodiment of the present disclosure.

In the laminated coil component according to the first embodiment of the present disclosure, each of a first laminated portion and a second laminated portion includes three coil conductors adjacent to each other.

FIG. 1 is a schematic perspective view illustrating an example of the laminated coil component according to the first embodiment of the present disclosure.

A laminated coil component 1 illustrated in FIG. 1 includes an element body 10A, a first external electrode 21, and a second external electrode 22. Although not illustrated in FIG. 1, as described later, the laminated coil component 1 also includes a coil provided inside the element body 10A.

In the present description, a length direction, a height direction, and a width direction are respectively defined as L. T. and W, according to FIG. 1 and the like. Here, the length direction L, the height direction T, and the width direction W are orthogonal to each other.

The element body 10A has a first end surface 11*a* and a second end surface 11*b* facing each other in the length direction L, a first main surface 12*a* and a second main surface 12*b* facing each other in the height direction T, and a first side surface 13*a* and a second side surface 13*b* facing each other in the width direction W, and has, for example, a rectangular parallelepiped shape or a substantially rectangular parallelepiped shape.

The first end surface 11*a* and the second end surface 11*b* of the element body 10A do not need to be strictly orthogonal to the length direction L. Further, the first main surface 12*a* and the second main surface 12*b* of the element body 10A do not need to be strictly orthogonal to the height direction T. Furthermore, the first side surface 13*a* and the second side surface 13*b* of the element body 10A do not need to be strictly orthogonal to the width direction W.

In a case where the laminated coil component 1 is mounted on a substrate, the first main surface 12*a* of the element body 10A serves as a mounting surface.

The element body 10A preferably has a corner portion and a ridge portion that are rounded. The corner portion of the element body 10A is a portion where three surfaces of the element body 10A intersect. The ridge portion of the element body 10A is a portion where two surfaces of the element body 10A intersect.

The first external electrode 21 is provided on a surface of the element body 10A. More specifically, the first external electrode 21 extends from the first end surface 11*a* of the element body 10A over a part of each of the first main surface 12*a*, the second main surface 12*b*, the first side surface 13*a*, and the second side surface 13*b*.

An arrangement mode of the first external electrode 21 is not limited to a mode illustrated in FIG. 1. For example, the first external electrode 21 may extend from a part of the first main surface 12*a* of the element body 10A to a part of each of the first end surface 11*a*, the first side surface 13*a*, and the second side surface 13*b*.

The second external electrode 22 is provided on a surface of the element body 10A. More specifically, the second external electrode 22 extends from the second end surface 11*b* of the element body 10A over a part of each of the first main surface 12*a*, the second main surface 12*b*, the first side surface 13*a*, and the second side surface 13*b*.

An arrangement mode of the second external electrode 22 is not limited to the mode illustrated in FIG. 1. For example, the second external electrode 22 may extend from a part of the first main surface 12*a* of the element body 10A to a part of each of the second end surface 11*b*, the first side surface 13*a*, and the second side surface 13*b*.

As described above, the first external electrode 21 and the second external electrode 22 are provided at positions separated from each other on a surface of the element body 10A.

As described above, since the first external electrode 21 and the second external electrode 22 are provided on the first main surface 12*a* of the element body 10A as a mounting surface, mountability of the laminated coil component 1 is improved.

Each of the first external electrode 21 and the second external electrode 22 may have a single-layer structure or a multilayer structure.

In a case where each of the first external electrode 21 and the second external electrode 22 has a single-layer structure, examples of a constituent material of each of the external electrodes include Ag, Au, Cu, Pd, Ni, Al, an alloy containing at least one of these types of metal, and the like.

In a case where each of the first external electrode 21 and the second external electrode 22 has a multilayer structure, each of the external electrodes may have, for example, a base electrode containing Ag, a Ni plated electrode, and a Sn plated electrode in this order from the surface side of the element body 10A.

Figure 2:
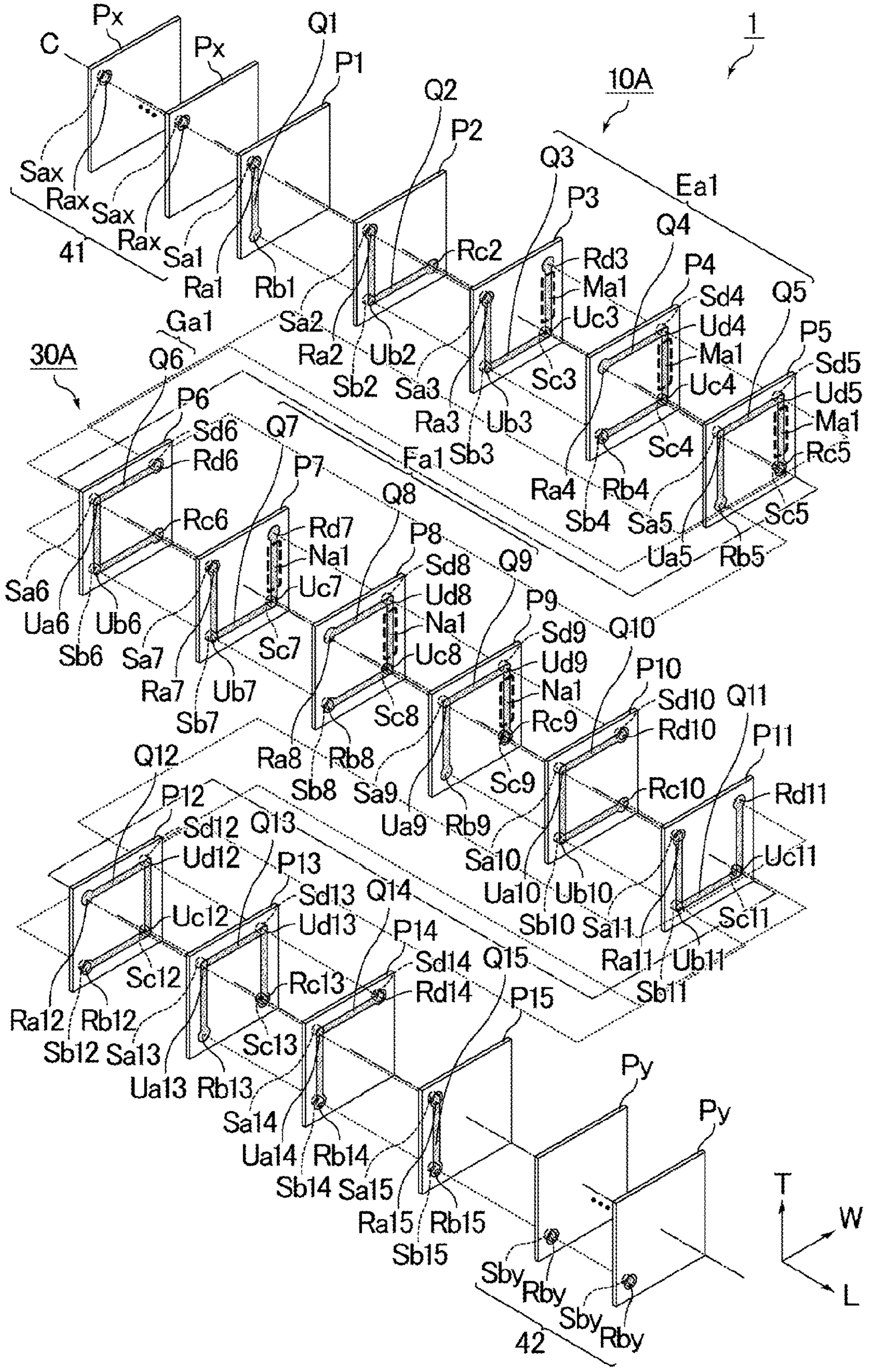
FIG. 2 is a schematic perspective view illustrating an example of a state in which the laminated coil component illustrated in FIG. 1 (where an external electrode is excluded) is disassembled.
Figure 3:
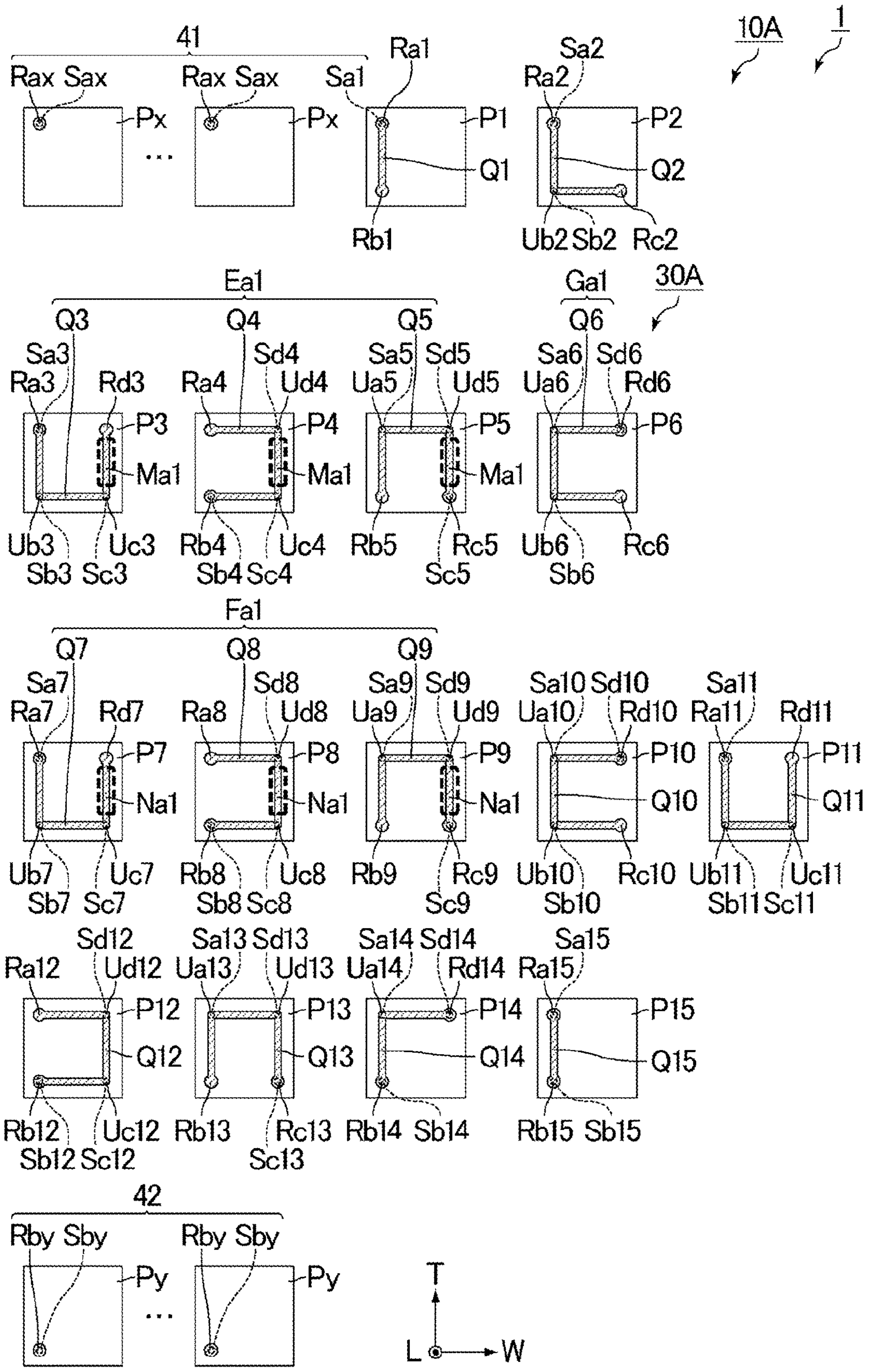
FIG. 3 is a schematic plan view illustrating an example of a state in which the laminated coil component illustrated in FIG. 1 (where an external electrode is excluded) is disassembled.

FIG. 2 is a schematic perspective view illustrating an example of a state in which the laminated coil component illustrated in FIG. 1 (where an external electrode is excluded) is disassembled. FIG. 3 is a schematic plan view illustrating an example of a state in which the laminated coil component illustrated in FIG. 1 (where an external electrode is excluded) is disassembled.

As illustrated in FIGS. 2 and 3, the element body 10A includes a plurality of insulating layers laminated in a lamination direction, here, the length direction L.

The element body 10A includes an insulating layer P1, an insulating layer P2, an insulating layer P3, an insulating layer P4, an insulating layer P5, an insulating layer P6, an insulating layer P7, an insulating layer P8, an insulating layer P9, an insulating layer P10, an insulating layer P11, an insulating layer P12, an insulating layer P13, an insulating layer P14, and an insulating layer P15 in order in the length direction L from the first end surface 11*a* side toward the second end surface 11*b* side.

Examples of a constituent material of each insulating layer include a magnetic material such as a ferrite material.

The ferrite material is preferably a Ni—Cu—Zn-based ferrite material.

The Ni—Cu—Zn-based ferrite material preferably contains Fe in an amount of 40 mol % or more and 49.5 mol % or less (i.e., from 40 mol % to 49.5 mol %) in terms of $Fe_2O_3$, Zn in an amount of 2 mol % or more and 35 mol % or less (i.e., from 2 mol % to 35 mol %) in terms of ZnO, Cu in an amount of 6 mol % or more and 13 mol % or less (i.e., from 6 mol % to 13 mol %) in terms of CuO, and Ni in an amount of 10 mol % or more and 45 mol % or less (i.e. from 10 mol % to 45 mol %) in terms of NiO when the total amount is 100 mol %.

The Ni—Cu—Zn-based ferrite material may further contain an additive such as Co, Bi, Sn, or Mn.

The Ni—Cu—Zn-based ferrite material may further contain inevitable impurities.

A coil 30A is provided inside the element body 10A.

As illustrated in FIGS. 2 and 3, the coil 30A includes a coil conductor Q1, a coil conductor Q2, a coil conductor Q3, a coil conductor Q4, a coil conductor Q5, a coil conductor Q6, a coil conductor Q7, a coil conductor Q8, a coil conductor Q9, a coil conductor Q10, a coil conductor Q11, a coil conductor Q12, a coil conductor Q13, a coil conductor Q14, and a coil conductor Q15 in order in the length direction L.

The coil conductor Q1 is linear and provided on a main surface of the insulating layer P1.

The coil conductor Q1 has a land portion Ra1 and a land portion Rb1 at different end portions.

The coil conductor Q2 has an L shape and is provided on a main surface of the insulating layer P2.

The coil conductor Q2 has a land portion Ra2 and a land portion Rc2 at different end portions.

The land portion Ra2 is connected to a via conductor Sa2 penetrating the insulating layer P2 in the length direction L. The via conductor Sa2 is connected to the land portion Ra1 in addition to the land portion Ra2. That is, the land portion Ra1 and the land portion Ra2 are electrically connected via the via conductor Sa2.

The coil conductor Q2 has a bent portion Ub2.

The bent portion Ub2 is connected to a via conductor Sb2 penetrating the insulating layer P2 in the length direction L. The via conductor Sb2 is connected to the land portion Rb1 in addition to the bent portion Ub2. That is, the land portion Rb1 and the bent portion Ub2 are electrically connected via the via conductor Sb2.

The coil conductor Q3 has a U shape and is provided on a main surface of the insulating layer P3.

The coil conductor Q3 has a land portion Ra3 and a land portion Rd3 at different end portions.

The land portion Ra3 is connected to a via conductor Sa3 penetrating the insulating layer P3 in the length direction L. The via conductor Sa3 is connected to the land portion Ra2 in addition to the land portion Ra3. That is, the land portion Ra2 and the land portion Ra3 are electrically connected via the via conductor Sa3.

The coil conductor Q3 has a bent portion Ub3 and a bent portion Uc3.

The bent portion Ub3 is connected to the via conductor Sb3 penetrating the insulating layer P3 in the length direction L. The via conductor Sb3 is connected to the bent portion Ub2 in addition to the bent portion Ub3. That is, the bent portion Ub2 and the bent portion Ub3 are electrically connected via the via conductor Sb3.

The bent portion Uc3 is connected to a via conductor Sc3 penetrating the insulating layer P3 in the length direction L. The via conductor Sc3 is connected to the land portion Rc2 in addition to the bent portion Uc3. That is, the land portion Rc2 and the bent portion Uc3 are electrically connected via the via conductor Sc3.

The coil conductor Q4 has a U shape and is provided on a main surface of the insulating layer P4.

The coil conductor Q4 has a land portion Ra4 and a land portion Rb4 at different end portions.

The land portion Rb4 is connected to a via conductor Sb4 penetrating the insulating layer P4 in the length direction L.

The via conductor Sb4 is connected to the bent portion Ub3 in addition to the land portion Rb4. That is, the bent portion Ub3 and the land portion Rb4 are electrically connected via the via conductor Sb4.

The coil conductor Q4 has a bent portion Uc4 and a bent portion Ud4.

The bent portion Uc4 is connected to a via conductor Sc4 penetrating the insulating layer P4 in the length direction L. The via conductor Sc4 is connected to the bent portion Uc3 in addition to the bent portion Uc4. That is, the bent portion Uc3 and the bent portion Uc4 are electrically connected via the via conductor Sc4.

The bent portion Ud4 is connected to a via conductor Sd4 penetrating the insulating layer P4 in the length direction L. The via conductor Sd4 is connected to the land portion Rd3 in addition to the bent portion Ud4. That is, the land portion Rd3 and the bent portion Ud4 are electrically connected via the via conductor Sd4.

The coil conductor Q5 has a U shape and is provided on a main surface of the insulating layer P5.

The coil conductor Q5 has a land portion Rb5 and a land portion Rc5 at different end portions.

The land portion Rc5 is connected to a via conductor Sc5 penetrating the insulating layer P5 in the length direction L. The via conductor Sc5 is connected to the bent portion Uc4 in addition to the land portion Rc5. That is, the bent portion Uc4 and the land portion Rc5 are electrically connected via the via conductor Sc5.

The coil conductor Q5 has a bent portion Ua5 and a bent portion Ud5.

The bent portion Ua5 is connected to a via conductor Sa5 penetrating the insulating layer P5 in the length direction L. The via conductor Sa5 is connected to the land portion Ra4 in addition to the bent portion Ua5. That is, the land portion Ra4 and the bent portion Ua5 are electrically connected via the via conductor Sa5.

The bent portion Ud5 is connected to a via conductor Sd5 penetrating the insulating layer P5 in the length direction L. The via conductor Sd5 is connected to the bent portion Ud4 in addition to the bent portion Ud5. That is, the bent portion Ud4 and the bent portion Ud5 are electrically connected via the via conductor Sd5.

The coil conductor Q6 has a U shape and is provided on a main surface of the insulating layer P6.

The coil conductor Q6 has a land portion Rc6 and a land portion Rd6 at different end portions.

The land portion Rd6 is connected to a via conductor Sd6 penetrating the insulating layer P6 in the length direction L. The via conductor Sd6 is connected to the bent portion Ud5 in addition to the land portion Rd6. That is, the bent portion Ud5 and the land portion Rd6 are electrically connected via the via conductor Sd6.

The coil conductor Q6 has a bent portion Ua6 and a bent portion Ub6.

The bent portion Ua6 is connected to a via conductor Sa6 penetrating the insulating layer P6 in the length direction L. The via conductor Sa6 is connected to the bent portion Ua5 in addition to the bent portion Ua6. That is, the bent portion Ua5 and the bent portion Ua6 are electrically connected via the via conductor Sa6.

The bent portion Ub6 is connected to a via conductor Sb6 penetrating the insulating layer P6 in the length direction L. The via conductor Sb6 is connected to the land portion Rb5 in addition to the bent portion Ub6. That is, the land portion Rb5 and the bent portion Ub6 are electrically connected via the via conductor Sb6.

The coil conductor Q7 has a U shape and is provided on a main surface of the insulating layer P7.

The coil conductor Q7 has a land portion Ra7 and a land portion Rd7 at different end portions.

The land portion Ra7 is connected to a via conductor Sa7 penetrating the insulating layer P7 in the length direction L. The via conductor Sa7 is connected to the bent portion Ua6 in addition to the land portion Ra7. That is, the bent portion Ua6 and the land portion Ra7 are electrically connected via the via conductor Sa7.

The coil conductor Q7 has a bent portion Ub7 and a bent portion Uc7.

The bent portion Ub7 is connected to a via conductor Sb7 penetrating the insulating layer P7 in the length direction L. The via conductor Sb7 is connected to the bent portion Ub6 in addition to the bent portion Ub7. That is, the bent portion Ub6 and the bent portion Ub7 are electrically connected via the via conductor Sb7.

The bent portion Uc7 is connected to a via conductor Sc7 penetrating the insulating layer P7 in the length direction L. The via conductor Sc7 is connected to the land portion Rc6 in addition to the bent portion Uc7. That is, the land portion Rc6 and the bent portion Uc7 are electrically connected via the via conductor Sc7.

The coil conductor Q8 has a U shape and is provided on a main surface of the insulating layer P8.

The coil conductor Q8 has a land portion Ra8 and a land portion Rb8 at different end portions.

The land portion Rb8 is connected to a via conductor Sb8 penetrating the insulating layer P8 in the length direction L. The via conductor Sb8 is connected to the bent portion Ub7 in addition to the land portion Rb8. That is, the bent portion Ub7 and the land portion Rb8 are electrically connected via the via conductor Sb8.

The coil conductor Q8 has a bent portion Uc8 and a bent portion Ud8.

The bent portion Uc8 is connected to a via conductor Sc8 penetrating the insulating layer P8 in the length direction L. The via conductor Sc8 is connected to the bent portion Uc7 in addition to the bent portion Uc8. That is, the bent portion Uc7 and the bent portion Uc8 are electrically connected via the via conductor Sc8.

The bent portion Ud8 is connected to a via conductor Sd8 penetrating the insulating layer P8 in the length direction L. The via conductor Sd8 is connected to the land portion Rd7 in addition to the bent portion Ud8. That is, the land portion Rd7 and the bent portion Ud8 are electrically connected via the via conductor Sd8.

The coil conductor Q9 has a U shape and is provided on a main surface of the insulating layer P9.

The coil conductor Q9 has a land portion Rb9 and a land portion Rc9 at different end portions.

The land portion Rc9 is connected to a via conductor Sc9 penetrating the insulating layer P9 in the length direction L. The via conductor Sc9 is connected to the bent portion Uc8 in addition to the land portion Rc9. That is, the bent portion Uc8 and the land portion Rc9 are electrically connected via the via conductor Sc9.

The coil conductor Q9 has a bent portion Ua9 and a bent portion Ud9.

The bent portion Ua9 is connected to a via conductor Sa9 penetrating the insulating layer P9 in the length direction L. The via conductor Sa9 is connected to the land portion Ra8 in addition to the bent portion Ua9. That is, the land portion Ra8 and the bent portion Ua9 are electrically connected via the via conductor Sa9.

The bent portion Ud9 is connected to a via conductor Sd9 penetrating the insulating layer P9 in the length direction L. The via conductor Sd9 is connected to the bent portion Ud8 in addition to the bent portion Ud9. That is, the bent portion Ud8 and the bent portion Ud9 are electrically connected via the via conductor Sd9.

The coil conductor Q10 has a U shape and is provided on a main surface of the insulating layer P10.

The coil conductor Q10 has a land portion Rc10 and a land portion Rd10 at different end portions.

The land portion Rd10 is connected to a via conductor Sd10 penetrating the insulating layer P10 in the length direction L. The via conductor Sd10 is connected to the bent portion Ud9 in addition to the land portion Rd10. That is, the bent portion Ud9 and the land portion Rd10 are electrically connected via the via conductor Sd10.

The coil conductor Q10 has a bent portion Ua10 and a bent portion Ub10.

The bent portion Ua10 is connected to a via conductor Sa10 penetrating the insulating layer P10 in the length direction L. The via conductor Sa10 is connected to the bent portion Ua9 in addition to the bent portion Ua10. That is, the bent portion Ua9 and the bent portion Ua10 are electrically connected via the via conductor Sa10.

The bent portion Ub10 is connected to a via conductor Sb10 penetrating the insulating layer P10 in the length direction L. The via conductor Sb10 is connected to the land portion Rb9 in addition to the bent portion Ub10. That is, the land portion Rb9 and the bent portion Ub10 are electrically connected via the via conductor Sb10.

The coil conductor Q11 has a U shape and is provided on a main surface of the insulating layer P11.

The coil conductor Q11 has a land portion Ra11 and a land portion Rd11 at different end portions.

The land portion Ra11 is connected to a via conductor Sa11 penetrating the insulating layer P11 in the length direction L. The via conductor Sa11 is connected to the bent portion Ua10 in addition to the land portion Ra11. That is, the bent portion Ua10 and the land portion Ra11 are electrically connected via the via conductor Sa11.

The coil conductor Q11 has a bent portion Ub11 and a bent portion Uc11.

The bent portion Ub11 is connected to a via conductor Sb11 penetrating the insulating layer P11 in the length direction L. The via conductor Sb11 is connected to the bent portion Ub10 in addition to the bent portion Ub11. That is, the bent portion Ub10 and the bent portion Ub11 are electrically connected via the via conductor Sb11.

The bent portion Uc11 is connected to a via conductor Sc11 penetrating the insulating layer P11 in the length direction L. The via conductor Sc11 is connected to the land portion Rc10 in addition to the bent portion Uc11. That is, the land portion Rc10 and the bent portion Uc11 are electrically connected via the via conductor Sc11.

The coil conductor Q12 has a U shape and is provided on a main surface of the insulating layer P12.

The coil conductor Q12 has a land portion Ra12 and a land portion Rb12 at different end portions.

The land portion Rb12 is connected to a via conductor Sb12 penetrating the insulating layer P12 in the length direction L. The via conductor Sb12 is connected to the bent portion Ub11 in addition to the land portion Rb12. That is, the bent portion Ub11 and the land portion Rb12 are electrically connected via the via conductor Sb12.

The coil conductor Q12 has a bent portion Uc12 and a bent portion Ud12.

The bent portion Uc12 is connected to a via conductor Sc12 penetrating the insulating layer P12 in the length direction L. The via conductor Sc12 is connected to the bent portion Uc11 in addition to the bent portion Uc12. That is, the bent portion Uc11 and the bent portion Uc12 are electrically connected via the via conductor Sc12.

The bent portion Ud12 is connected to a via conductor Sd12 penetrating the insulating layer P12 in the length direction L. The via conductor Sd12 is connected to the land portion Rd11 in addition to the bent portion Ud12. That is, the land portion Rd11 and the bent portion Ud12 are electrically connected via the via conductor Sd12.

The coil conductor Q13 has a U shape and is provided on a main surface of the insulating layer P13.

The coil conductor Q13 has a land portion Rb13 and a land portion Rc13 at different end portions.

The land portion Rc13 is connected to a via conductor Sc13 penetrating the insulating layer P13 in the length direction L. The via conductor Sc13 is connected to the bent portion Uc12 in addition to the land portion Rc13. That is, the bent portion Uc12 and the land portion Rc13 are electrically connected via the via conductor Sc13.

The coil conductor Q13 has a bent portion Ua13 and a bent portion Ud13.

The bent portion Ua13 is connected to a via conductor Sa13 penetrating the insulating layer P13 in the length direction L. The via conductor Sa13 is connected to the land portion Ra12 in addition to the bent portion Ua13. That is, the land portion Ra12 and the bent portion Ua13 are electrically connected via the via conductor Sa13.

The bent portion Ud13 is connected to a via conductor Sd13 penetrating the insulating layer P13 in the length direction L. The via conductor Sd13 is connected to the bent portion Ud12 in addition to the bent portion Ud13. That is, the bent portion Ud12 and the bent portion Ud13 are electrically connected via the via conductor Sd13.

The coil conductor Q14 has an L shape and is provided on a main surface of the insulating layer P14.

The coil conductor Q14 has a land portion Rb14 and a land portion Rd14 at different end portions.

The land portion Rb14 is connected to a via conductor Sb14 penetrating the insulating layer P14 in the length direction L. The via conductor Sb14 is connected to the land portion Rb13 in addition to the land portion Rb14. That is, the land portion Rb13 and the land portion Rb14 are electrically connected via the via conductor Sb14.

The land portion Rd14 is connected to a via conductor Sd14 penetrating the insulating layer P14 in the length direction L. The via conductor Sd14 is connected to the bent portion Ud13 in addition to the land portion Rd14. That is, the bent portion Ud13 and the land portion Rd14 are electrically connected via the via conductor Sd14.

The coil conductor Q14 has a bent portion Ua14.

The bent portion Ua14 is connected to a via conductor Sa14 penetrating the insulating layer P14 in the length direction L. The via conductor Sa14 is connected to the bent portion Ua13 in addition to the bent portion Ua14. That is, the bent portion Ua13 and the bent portion Ua14 are electrically connected via the via conductor Sa14.

The coil conductor Q15 has a linear shape and is provided on a main surface of the insulating layer P15.

The coil conductor Q15 has a land portion Ra15 and a land portion Rb15 at different end portions.

The land portion Ra15 is connected to a via conductor Sa15 penetrating the insulating layer P15 in the length direction L. The via conductor Sa15 is connected to the bent portion Ua14 in addition to the land portion Ra15. That is, the bent portion Ua14 and the land portion Ra15 are electrically connected via the via conductor Sa15.

The land portion Rb15 is connected to a via conductor Sb15 penetrating the insulating layer P15 in the length direction L. The via conductor Sb15 is connected to the land portion Rb14 in addition to the land portion Rb15. That is, the land portion Rb14 and the land portion Rb15 are electrically connected via the via conductor Sb15.

In the present description, the L shape only needs to be a shape in which two sides are substantially orthogonal to each other, and does not need to be a shape in which two sides are strictly orthogonal to each other.

In the present description, the U shape only needs to be a shape in which two adjacent sides of three sides are substantially orthogonal to each other, and does not need to be a shape in which two adjacent sides of three sides are strictly orthogonal to each other.

In the laminated coil component 1, as described above, the insulating layer P1, the insulating layer P2, the insulating layer P3, the insulating layer P4, the insulating layer P5, the insulating layer P6, the insulating layer P7, the insulating layer P8, the insulating layer P9, the insulating layer P10, the insulating layer P11, the insulating layer P12, the insulating layer P13, the insulating layer P14, and the insulating layer P15 are laminated in order in the length direction L. By the above, the coil conductor Q1, the coil conductor Q2, the coil conductor Q3, the coil conductor Q4, the coil conductor Q5, the coil conductor Q6, the coil conductor Q7, the coil conductor Q8, the coil conductor Q9, the coil conductor Q10, the coil conductor Q11, the coil conductor Q12, the coil conductor Q13, the coil conductor Q14, and the coil conductor Q15 are electrically connected via the via conductors described above while being laminated in order in the length direction L together with the insulating layer, and as a result, the coil 30A is configured.

The coil 30A has, for example, a solenoid shape.

When viewed from the length direction L, the coil 30A may have a shape constituted by a straight portion (for example, a polygonal shape) as illustrated in FIGS. 2 and 3, a shape constituted by a curved portion (for example, a circular shape), or a shape constituted by a straight portion and a curved portion.

In the laminated coil component of the present disclosure, the lamination direction and a direction of a coil axis of the coil are preferably parallel to a mounting surface of the element body along the same direction.

In the element body 10A, the lamination direction of the insulating layer is parallel to the length direction L. That is, the lamination direction of the insulating layer is parallel to the first main surface 12*a* of the element body 10A which is a mounting surface.

The coil 30A has a coil axis C. The coil axis C of the coil 30A corresponds to a central axis of the coil 30A when viewed from the length direction L, and extends in the length direction L. That is, a direction of the coil axis C of the coil 30A is parallel to the first main surface 12*a* of the element body 10A which is a mounting surface.

Therefore, in the laminated coil component 1, the lamination direction of the insulating layer and the direction of the coil axis C of the coil 30A are parallel to the first main surface 12*a* of the element body 10A as a mounting surface along the same length direction L.

In the laminated coil component 1, a mode in which the lamination direction of the insulating layer and the direction of the coil axis C of the coil 30A are parallel to the first main surface 12*a* of the element body 10A as a mounting surface along the same length direction L. However, the lamination direction of the insulating layer and the direction of the coil axis of the coil may be orthogonal to the first main surface of the element body as a mounting surface.

In the laminated coil component 1, a plurality of coil conductors laminated in the length direction L include a first laminated portion Ea1, a second laminated portion Fa1, and an intermediate portion Ga1.

The first laminated portion Ea1 includes three of the coil conductors Q3, Q4, and Q5 adjacent to each other.

The first laminated portion Ea1 has a first parallel section Ma1 in which all the coil conductors constituting the first laminated portion Ea1, that is, the coil conductor Q3, the coil conductor Q4, and the coil conductor Q5 overlap each other when viewed from the length direction L.

The first parallel sections Ma1 are connected in parallel by the via conductor Sc4, the via conductor Sd4, the via conductor Sc5, and the via conductor Sd5. That is, the coil conductor Q3, the coil conductor Q4, and the coil conductor Q5 are connected in parallel in the first parallel sections Ma1.

All of the coil conductor Q3, the coil conductor Q4, and the coil conductor Q5 do not overlap each other when viewed from the length direction L in a section other than the first parallel section Ma1.

The second laminated portion Fa1 includes three of the coil conductors Q7, Q8, and Q9 adjacent to each other which are as many as the coil conductors in the first laminated portion Ea1 (i.e., a number of the coil conductors Q7, Q8 and Q9 in the second laminated portion Fa1 is the same as the number of the coil conductors Q3, Q4 and Q5 in the first laminated portion Ea1).

The second laminated portion Fa1 has a second parallel section Na1 in which all the coil conductors constituting the second laminated portion Fa1, that is, the coil conductor Q7, the coil conductor Q8, and the coil conductor Q9 overlap each other when viewed from the length direction L.

The second parallel sections Na1 are connected in parallel by the via conductor Sc8, the via conductor Sd8, the via conductor Sc9, and the via conductor Sd9. That is, the coil conductor Q7, the coil conductor Q8, and the coil conductor Q9 are connected in parallel in the second parallel sections Na1.

All of the coil conductor Q7, the coil conductor Q8, and the coil conductor Q9 do not overlap each other when viewed from the length direction L in a section other than the second parallel section Na1.

The first parallel section Ma1 and the second parallel section Na1 overlap each other when viewed from the length direction L.

In the above description, in the laminated coil component 1, the first laminated portion Ea1 and the second laminated portion Fa1 are exemplified as laminated portions including three coil conductors adjacent to each other, but the same applies to laminated portions including another combination of three coil conductors adjacent to each other. That is, in the laminated coil component 1, three coil conductors adjacent to each other are connected in parallel in a parallel section in which the coil conductors overlap each other when viewed from the length direction L.

In the laminated coil component 1, since three coil conductors adjacent to each other are connected in parallel in a parallel section, a sectional area of the coil 30A orthogonal to a direction along a current path of the coil 30A, that is, a direction in which the coil conductor extends increases accordingly. Therefore, in the laminated coil component 1, direct current resistance (Rdc) of the coil 30A becomes low, and large current can flow through the coil 30A.

The intermediate portion Ga1 is adjacent to the first laminated portion Ea1 and the second laminated portion Fa1 between both of the laminated portions, and includes one of the coil conductor Q6.

All the coil conductors constituting the intermediate portion Ga1, that is, the coil conductor Q6 does not overlap each part of the first parallel section Ma1 and the second parallel section Na1 when viewed from the length direction L. More specifically, the coil conductor Q6 does not overlap a region (region surrounded by a broken line) other than both ends (including a connection portion where a coil conductor and a via conductor are connected) of the first parallel section Ma1 and a region (region surrounded by a broken line) other than both ends (including a connection portion where a coil conductor and a via conductor are connected) of the second parallel section Na1 when viewed from the length direction L.

Therefore, in the laminated coil component 1, when viewed from the length direction L, between the first parallel section Ma1 and the second parallel section Na1, a region where no coil conductor is present exists only for one layer in terms of an insulating layer.

In the above description, in the laminated coil component 1, a combination of the first laminated portion Ea1, the second laminated portion Fa1, and the intermediate portion Ga1 is described, but the same applies to another combination. That is, in the laminated coil component 1, when viewed from the length direction L, a region where no coil conductor is present exists only for one layer in terms of an insulating layer between the first parallel section and the second parallel section. Therefore, in the laminated coil component 1, for example, density is less likely to be locally lowered as compared with the laminated inductor illustrated in FIG. 12A of Japanese Patent Application Laid-Open No. 2019-9299. Therefore, in the laminated coil component 1, for example, defects such as a crack are less likely to occur in the element body 10A as compared with the laminated inductor illustrated in FIG. 12A of Japanese Patent Application Laid-Open No. 2019-9299.

In the laminated coil component of the present disclosure, the intermediate portion preferably includes one of the coil conductors.

In the laminated coil component 1, for example, the intermediate portion Ga1 includes one of the coil conductor Q6. That is, in the laminated coil component 1, when viewed from the length direction L, between the first parallel section Ma1 and the second parallel section Na1, a region where no coil conductor is present exists only for one layer in terms of an insulating layer. By the above, in the laminated coil component 1, local decrease in density is sufficiently prevented.

In the laminated coil component of the present disclosure, a length of all the coil conductors constituting the first laminated portion, the second laminated portion, and the intermediate portion may be a length of ¾ turns of the coil.

In the laminated coil component 1, for example, a length of all the coil conductors constituting the first laminated portion Ea1, the second laminated portion Fa1, and the intermediate portion Ga1 is a length of ¾ turns of the coil 30A.

In the present description, a length of the coil conductor means a length in a direction in which the coil conductor extends on a plane orthogonal to the lamination direction when viewed from the lamination direction (the length direction L in FIGS. 2 and 3).

The element body 10A further includes an insulating layer Px.

The insulating layer Px is laminated on the first end surface 11*a* side of the insulating layer P1, that is, on the side of the insulating layer P1 opposite to the insulating layer P2.

On a main surface of the insulating layer Px, a lead-out land portion Rax is provided. The lead-out land portion Rax is connected to a lead-out via conductor Sax penetrating the insulating layer Px in the length direction L. In addition to the lead-out via conductor Sax, the lead-out land portion Rax is also connected to a lead-out via conductor Sa1 penetrating the insulating layer P1 in the length direction L. By the above, a first lead-out conductor 41 including the lead-out land portion Rax, the lead-out via conductor Sax, and the lead-out via conductor Sa1 is configured.

The lead-out via conductor Sa1 is connected to the land portion Ra1 in addition to the lead-out land portion Rax. That is, the first lead-out conductor 41 is connected to the coil 30A.

Figure 4:
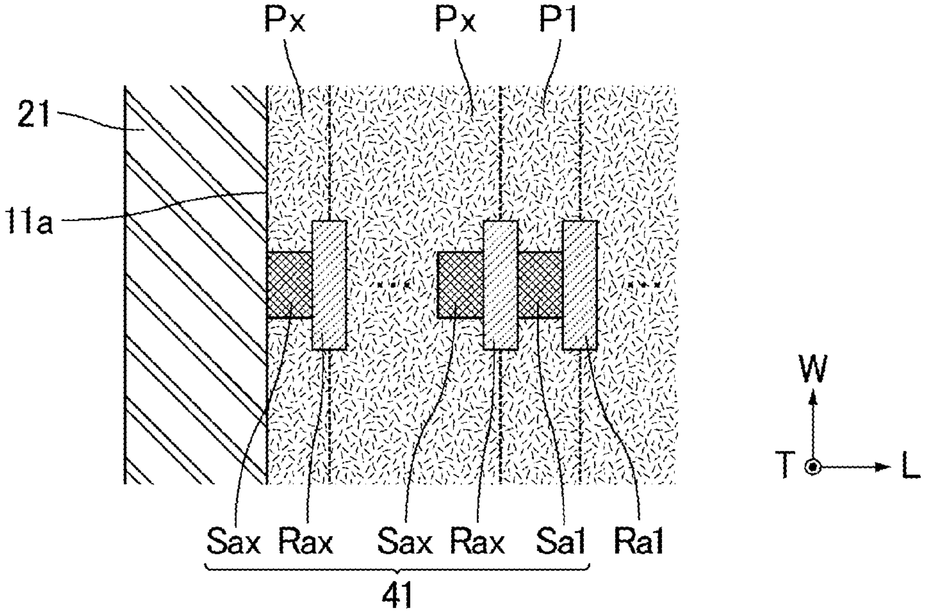
FIG. 4 is an enlarged schematic sectional view illustrating an example of a state in which the vicinity of a first end surface of an element body is viewed in a sectional view from a height direction in the laminated coil component illustrated in FIG. 1.

FIG. 4 is an enlarged schematic sectional view illustrating an example of a state in which the vicinity of a first end surface of an element body is viewed in a sectional view from the height direction in the laminated coil component illustrated in FIG. 1.

As illustrated in FIG. 4, since the insulating layer Px is laminated on the insulating layer P1 on the side opposite to the insulating layer P2, the first lead-out conductor 41 is exposed from the first end surface 11*a* of the element body 10A. The exposed portion of the first lead-out conductor 41 is connected to the first external electrode 21 provided on the first end surface 11*a* of the element body 10A.

Therefore, the coil 30A and the first external electrode 21 are electrically connected via the first lead-out conductor 41.

Note that, in FIG. 4, boundaries between the insulating layers are illustrated for convenience of description, but these boundaries do not clearly appear in practice.

The number of the insulating layers Px may be one or more.

In a case where the number of the insulating layers Px is plural, the first lead-out conductor 41 is formed by a plurality of the lead-out land portions Rax and a plurality of the lead-out via conductors Sax connected to each other and the lead-out via conductor Sa1 that is further connected.

The element body 10A further includes an insulating layer Py.

The insulating layer Py is laminated on the second end surface 11*b* side of the insulating layer P15, that is, on the side of the insulating layer P15 opposite to the insulating layer P14.

On a main surface of the insulating layer Py, a lead-out land portion Rby is provided. The lead-out land portion Rby is connected to a lead-out via conductor Sby penetrating the insulating layers Py in the length direction L. By the above, a second lead-out conductor 42 including the lead-out land portion Rby and the lead-out via conductor Sby is configured.

The lead-out via conductor Sby is connected to the land portion Rb15 in addition to the lead-out land portion Rby. That is, the second lead-out conductor 42 is connected to the coil 30A.

Figure 5:
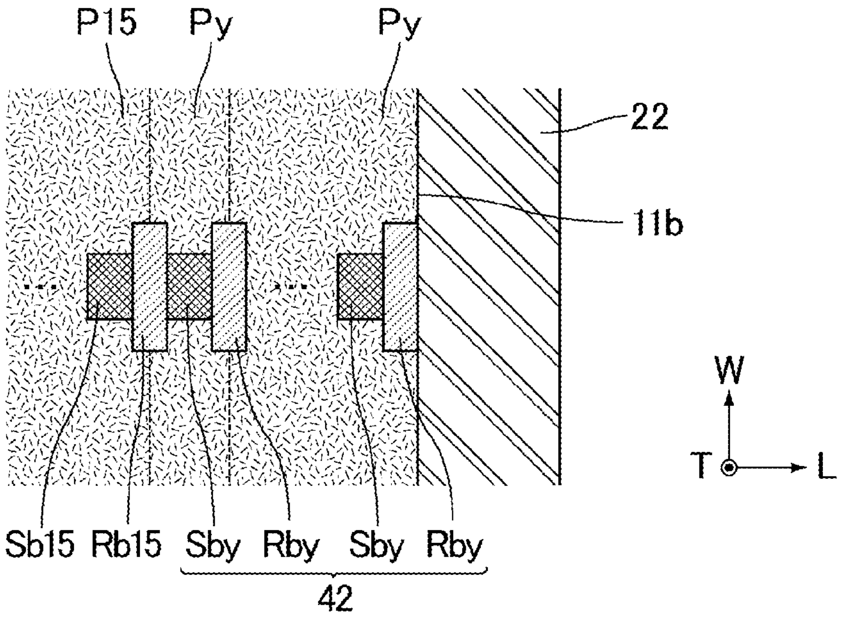
FIG. 5 is an enlarged schematic sectional view illustrating an example of a state in which the vicinity of a second end surface of the element body is viewed in a sectional view from the height direction in the laminated coil component illustrated in FIG. 1.

FIG. 5 is an enlarged schematic sectional view illustrating an example of a state in which the vicinity of a second end surface of the element body is viewed in a sectional view from the height direction in the laminated coil component illustrated in FIG. 1.

As illustrated in FIG. 5, since the insulating layer Py is laminated on the insulating layer P15 on the side opposite to the insulating layer P14, the second lead-out conductor 42 is exposed from the second end surface 11*b* of the element body 10A. The exposed portion of the second lead-out conductor 42 is connected to the second external electrode 22 provided on the second end surface 11*b* of the element body 10A.

Therefore, the coil 30A and the second external electrode 22 are electrically connected via the second lead-out conductor 42.

Note that, in FIG. 5, boundaries between the insulating layers are illustrated for convenience of description, but these boundaries do not clearly appear in practice.

The number of the insulating layers Py may be one or more.

In a case where the number of the insulating layers Py is plural, the second lead-out conductor 42 is formed by a plurality of the lead-out land portions Rby and a plurality of the lead-out via conductors Sby connected to each other.

The numbers of the insulating layers Px and Py may be the same or different from each other.

The laminated coil component 1 does not need to have at least one of the first lead-out conductor 41 and the second lead-out conductor 42.

Examples of a constituent material of each coil conductor (including a land portion), each via conductor, and each lead-out via conductor include Ag, Au, Cu, Pd, Ni, Al, and an alloy containing at least one type of the metal.

When viewed from the length direction L, each coil conductor may have a shape constituted by a straight portion as illustrated in FIGS. 2 and 3, a shape constituted by a curved portion, or a shape constituted by a straight portion and a curved portion.

When viewed from the length direction L, each land portion may have a circular shape or a polygonal shape.

When viewed from the length direction L, each via conductor may have a circular shape or a polygonal shape.

When viewed from the length direction L, each lead-out via conductor may have a circular shape or a polygonal shape.

Each coil conductor and each lead-out conductor may not independently have a land portion.

The laminated coil component 1 is manufactured, for example, by a method below.

<Producing Process of Magnetic Material>

First, $Fe_2O_3$, ZnO, CuO, and NiO are weighed so as to have a predetermined ratio.

Next, these weighed materials, pure water, and the like are put in a ball mill together with PSZ media, mixed, and then pulverized. Mixing and pulverizing time is, for example, four hours or more and eight hours or less (i.e., from four hours to eight hours).

Then, the obtained pulverized material is dried and then pre-fired. The pre-firing temperature is, for example, 700° C. or more and 800° C. or less (i.e., from 700° C. to 800° C.). The pre-firing time is, for example, two hours or more and five hours or less (i.e., from two hours to five hours).

In this way, a powdery magnetic material, more specifically, a powdery magnetic ferrite material is produced.

The ferrite material is preferably a Ni—Cu—Zn-based ferrite material.

The Ni—Cu—Zn-based ferrite material preferably contains Fe in an amount of 40 mol % or more and 49.5 mol % or less (i.e., from 40 mol % to 49.5 mol %) in terms of $Fe_2O_3$, Zn in an amount of 2 mol % or more and 35 mol % or less (i.e., from 2 mol % to 35 mol %) in terms of ZnO, Cu in an amount of 6 mol % or more and 13 mol % or less (i.e., from 6 mol % to 13 mol %) in terms of CuO, and Ni in an amount of 10 mol % or more and 45 mol % or less (i.e., from 10 mol % to 45 mol %) in terms of NiO when the total amount is 100 mol %.

The Ni—Cu—Zn-based ferrite material may further contain an additive such as Co, Bi, Sn, or Mn.

The Ni—Cu—Zn-based ferrite material may further contain inevitable impurities.

<Producing Process of Green Sheet>

First, a magnetic material, an organic binder such as polyvinyl butyral-based resin, an organic solvent such as ethanol or toluene, a plasticizer, and the like are put in a ball mill together with PSZ media and mixed, and then pulverized to produce slurry.

Next, the slurry is formed into a sheet shape having a predetermined thickness by a doctor blade method or the like, and then punched into a predetermined shape to produce a green sheet. The thickness of the green sheet is, for example, 20 μm or more and 30 μm or less (i.e., from 20 μm to 30 μm). The shape of the green sheet is, for example, a rectangular shape.

As a material of the green sheet, a nonmagnetic material such as a borosilicate glass material may be used instead of the magnetic material, or a mixed material of the magnetic material and the nonmagnetic material may be used.

<Formation Process of Conductor Pattern>

First, a predetermined portion of the green sheet is irradiated with a laser to form a via hole.

Next, conductive paste such as Ag paste is applied to a surface of the green sheet while the via hole is filled with the conductive paste by a screen printing method or the like. By the above, a conductor pattern for a coil conductor connected to a conductor pattern for a via conductor is formed on a surface of the green sheet while the conductor pattern for a via conductor is formed in the via hole. In this way, a coil sheet in which the conductor pattern for a coil conductor and the conductor pattern for a via conductor are formed on the green sheet is produced. A plurality of coil sheets are prepared, and a conductor pattern for a coil conductor corresponding to the coil conductor illustrated in FIGS. 2 and 3 and a conductor pattern for a via conductor corresponding to a via conductor (including the lead-out via conductor Sa1 illustrated in FIGS. 2 and 3) connected to the coil conductor illustrated in FIGS. 2 and 3 are formed for each coil sheet.

Further, conductive paste such as Ag paste is applied to a surface of the green sheet while the via hole is filled with the conductive paste by a screen printing method or the like. By the above, a conductor pattern for a land portion connected to a conductor pattern for a via conductor is formed on a surface of the green sheet while the conductor pattern for a via conductor is formed in the via hole. In this way, a via sheet in which the conductor pattern for a land portion and the conductor pattern for a via conductor are formed on the green sheet is produced separately from a coil sheet. A plurality of the via sheets are also prepared, and a conductor pattern for a land portion corresponding to the lead-out land portion constituting the lead-out conductor illustrated in FIGS. 2 and 3 and a conductor pattern for a via conductor corresponding to the lead-out via conductor (excluding the lead-out via conductor Sa1 illustrated in FIGS. 2 and 3) connected to the lead-out land portion illustrated in FIGS. 2 and 3 are formed on each of the via sheets.

<Producing Process of Laminate Block>

The coil sheet and the via sheet are laminated in the lamination direction (the length direction L in FIGS. 2 and 3) in the order corresponding to FIGS. 2 and 3, and then thermocompression-bonded to produce a laminate block.

<Producing Process of Element Body and Coil>

First, the laminated body block is cut into predetermined size with a dicer or the like to produce a chip as an individual piece.

Next, the chip as an individual piece is fired. The firing temperature is, for example, 900° C. or more and 920° C. or less (i.e., from 900° C. to 920° C.). The firing time is, for example, two hours or more and four hours or less (i.e., from two hours to four hours).

When the chip as an individual piece is fired, the green sheets of the coil sheet and the via sheet become insulating layers. As a result, an element body formed of a plurality of the insulating layers laminated in the lamination direction (the length direction L in FIGS. 2 and 3) is produced.

When the chip as an individual piece is fired, the conductor pattern for a coil conductor and the conductor pattern for a via conductor of the coil sheet become a coil conductor and a via conductor (including the lead-out via conductor Sa1 illustrated in FIGS. 2 and 3), respectively. As a result, a coil in which a plurality of the coil conductors laminated in the lamination direction (the length direction L in FIGS. 2 and 3) are electrically connected via the via conductor is produced.

As described above, the element body and the coil provided inside the element body are produced.

On the other hand, when the chip as an individual piece is fired, the conductor pattern for a land portion and the via conductor pattern of the via sheet become the lead-out land portion and the lead-out via conductor, respectively. As a result, the first lead-out conductor and the second lead-out conductor formed of a plurality of lead-out land portions and a plurality of lead-out via conductors laminated in the lamination direction (the length direction L in FIGS. 2 and 3) and connected alternately are produced. The first lead-out conductor is exposed from the first end surface of the element body. The second lead-out conductor is exposed from the second end surface of the element body.

The element body may be subjected to, for example, barrel polishing so that a corner portion and a ridge portion are rounded.

<Forming Process of External Electrode>

First, by applying conductive paste such as paste containing Ag and glass frit, a first coating film connected to the first lead-out conductor exposed from the first end surface of the element body is formed so as to extend from the first end surface of the element body over a part of each of the first main surface, the second main surface, the first side surface, and the second side surface.

Further, by applying conductive paste such as paste containing Ag and glass frit, a second coating film connected to the second lead-out conductor exposed from the second end surface of the element body is formed so as to extend from the second end surface of the element body over a part of each of the first main surface, the second main surface, the first side surface, and the second side surface.

In this way, the first coating film and the second coating film are formed at positions separated from each other on a surface of the element body.

When the first coating film and the second coating film are formed, the first coating film and the second coating film may be formed at different timings, or may be formed at the same timing.

In a case where the first coating film and the second coating film are formed at different timings, the first coating film and the second coating film may be formed in this order, or the second coating film and the first coating film may be formed in this order.

Next, by baking the first coating film, a first base electrode extending from the first end surface of the element body over a part of each of the first main surface, the second main surface, the first side surface, and the second side surface and connected to the first lead-out conductor is formed.

Further, by baking the second coating film, a second base electrode extending from the second end surface of the element body over a part of each of the first main surface, the second main surface, the first side surface, and the second side surface and connected to the second lead-out conductor is formed.

The baking temperature of the first coating film and the second coating film is, for example, 800° C. or more and 820° C. or less (i.e., from 800° C. to 820° C.).

The thickness of the first base electrode and the second base electrode is, for example, 5 μm.

Then, a Ni plated electrode and a Sn plated electrode are formed in order on a surface of the first base electrode by electrolytic plating or the like. By the above, the first external electrode including the first base electrode, the Ni plated electrode, and the Sn plated electrode in order from the surface side of the element body is formed.

A Ni plated electrode and a Sn plated electrode are formed in order on a surface of the second base electrode by electrolytic plating or the like. By the above, the second external electrode including the second base electrode, the Ni plated electrode, and the Sn plated electrode in order from the surface side of the element body is formed.

In this way, the first external electrode electrically connected to the coil via the first lead-out conductor and the second external electrode electrically connected to the coil via the second lead-out conductor are formed on a surface of the element body.

As described above, the laminated coil component 1 is manufactured.

Second Embodiment

In the laminated coil component according to the second embodiment of the present disclosure, each of the first laminated portion and the second laminated portion includes four coil conductors adjacent to each other. The laminated coil component of the second embodiment of the present disclosure is the same as the laminated coil component of the first embodiment of the present disclosure except for this point.

Figure 6:
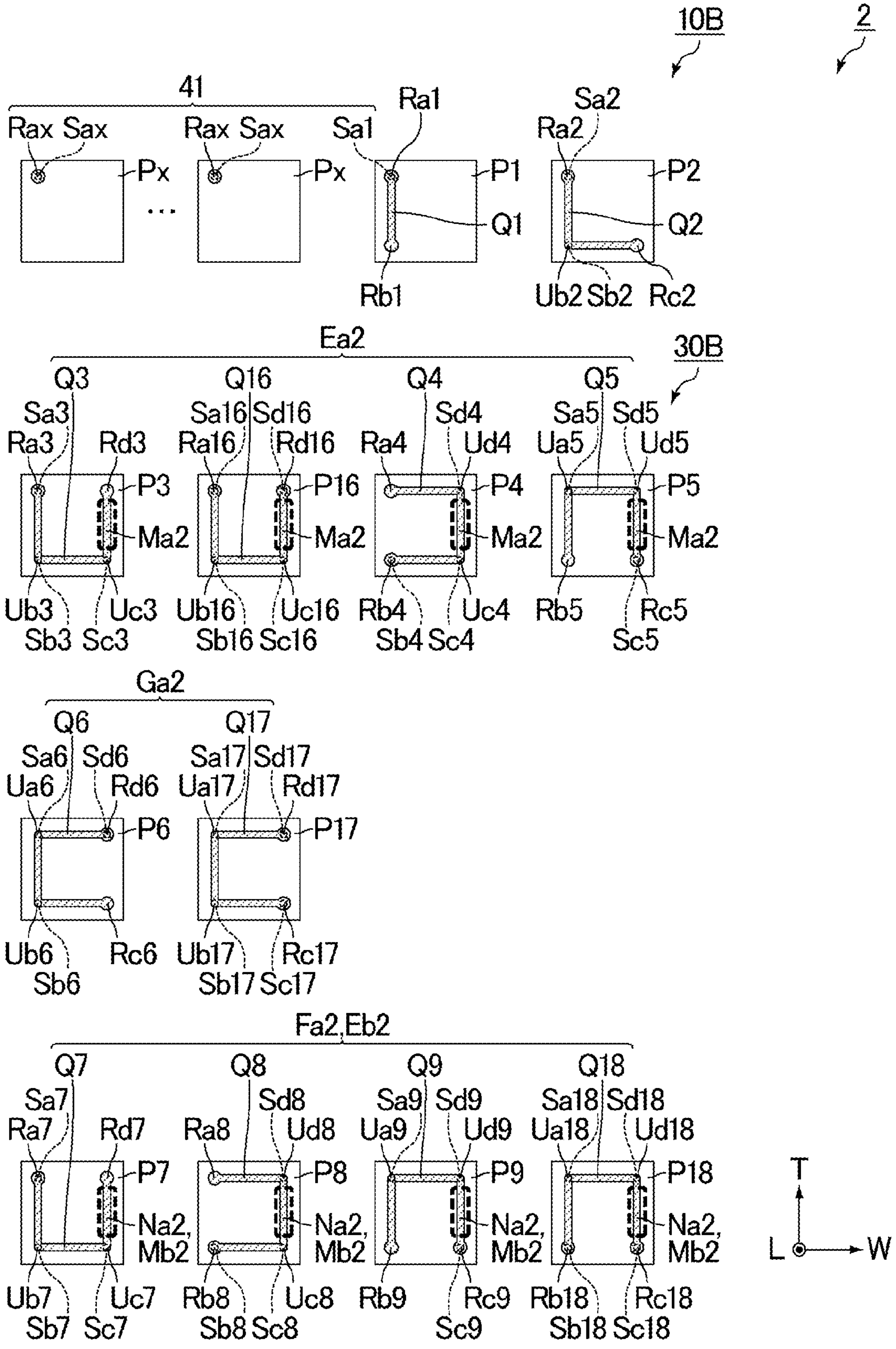
FIG. 6 is a schematic plan view illustrating an example of a state in which the laminated coil component (where an external electrode is excluded) according to a second embodiment of the present disclosure is disassembled.
Figure 7:
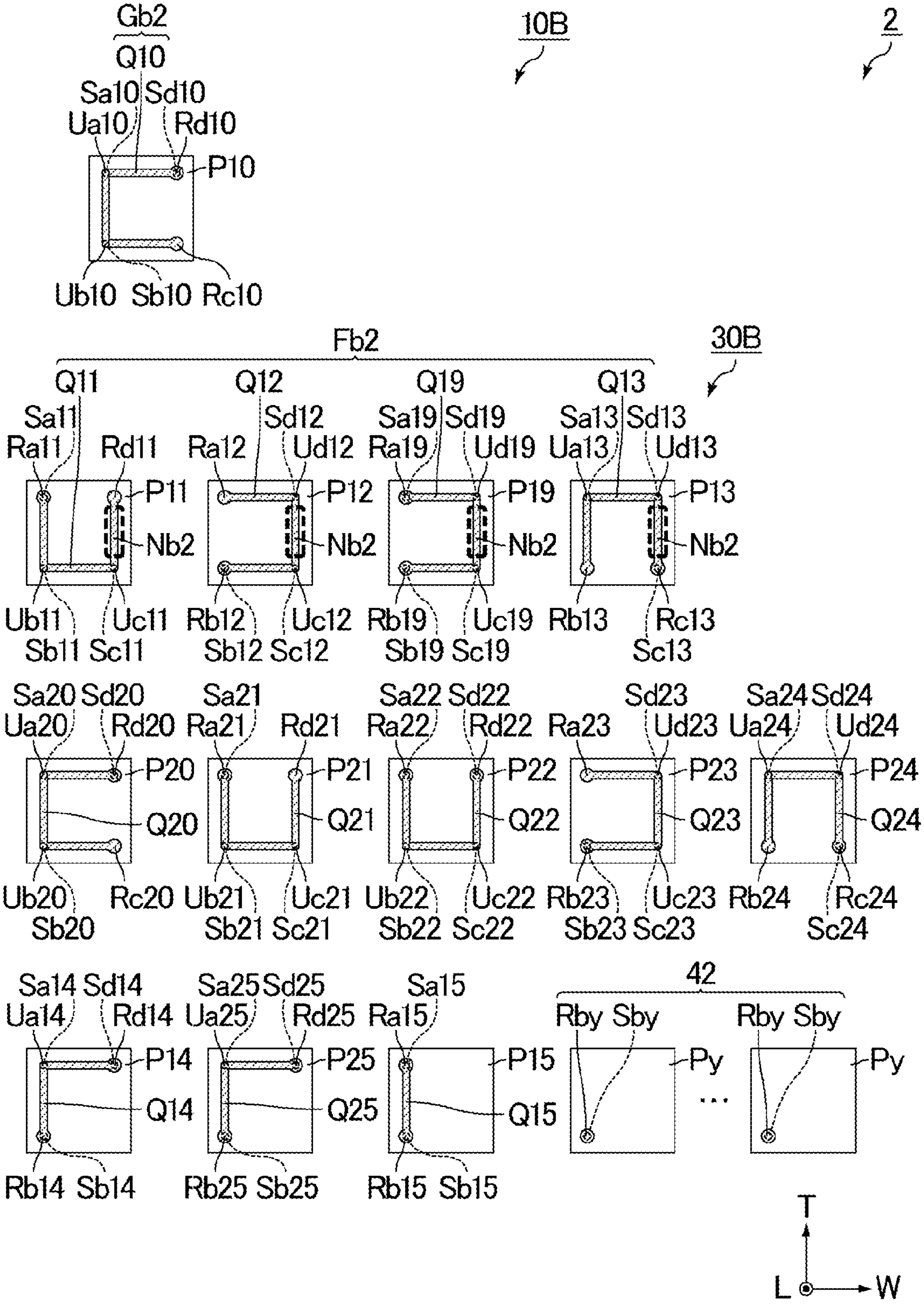
FIG. 7 is a schematic plan view illustrating an example of a state in which the laminated coil component (where an external electrode is excluded) according to the second embodiment of the present disclosure is disassembled, and illustrating a portion continuous with FIG. 6.

FIG. 6 is a schematic plan view illustrating an example of a state in which the laminated coil component (where an external electrode is excluded) according to the second embodiment of the present disclosure is disassembled. FIG. 7 is a schematic plan view illustrating an example of a state in which the laminated coil component (where an external electrode is excluded) according to the second embodiment of the present disclosure is disassembled, and illustrating a portion continuous with FIG. 6.

In a laminated coil component 2 illustrated in FIGS. 6 and 7, in an element body 10B, the insulating layer Px, the insulating layer P1, the insulating layer P2, the insulating layer P3, an insulating layer P16, the insulating layer P4, the insulating layer P5, the insulating layer P6, an insulating layer P17, the insulating layer P7, the insulating layer P8, the insulating layer P9, an insulating layer P18, the insulating layer P10, the insulating layer P11, the insulating layer P12, an insulating layer P19, the insulating layer P13, an insulating layer P20, an insulating layer P21, an insulating layer P22, an insulating layer P23, an insulating layer P24, the insulating layer P14, an insulating layer P25, the insulating layer P15, and the insulating layer Py are laminated in order in the length direction L. In the element body 10B, the insulating layer P16, the insulating layer P17, the insulating layer P18, the insulating layer P19, the insulating layer P20, the insulating layer P21, the insulating layer P22, the insulating layer P23, the insulating layer P24, and the insulating layer P25 are additionally provided at the above-described positions with respect to the element body 10A (see FIGS. 2 and 3).

A coil 30B is provided inside the element body 10B.

As illustrated in FIGS. 6 and 7, the coil 30B includes the coil conductor Q1, the coil conductor Q2, the coil conductor Q3, a coil conductor Q16, the coil conductor Q4, the coil conductor Q5, the coil conductor Q6, a coil conductor Q17, the coil conductor Q7, the coil conductor Q8, the coil conductor Q9, a coil conductor Q18, the coil conductor Q10, the coil conductor Q11, the coil conductor Q12, a coil conductor Q19, the coil conductor Q13, a coil conductor Q20, a coil conductor Q21, a coil conductor Q22, a coil conductor Q23, a coil conductor Q24, the coil conductor Q14, a coil conductor Q25, and the coil conductor Q15 in order in the length direction L. In the coil 30B, the coil conductor Q16, the coil conductor Q17, the coil conductor Q18, the coil conductor Q19, the coil conductor Q20, the coil conductor Q21, the coil conductor Q22, the coil conductor Q23, the coil conductor Q24, and the coil conductor Q25 are additionally provided at the above-described positions with respect to the coil 30A (see FIGS. 2 and 3).

Hereinafter, the insulating layers and the coil conductors newly provided in the laminated coil component 2 will be described. Note that a connection relationship between coil conductors adjacent to each other in the laminated coil component 2 is clear with reference to FIGS. 6 and 7 in accordance with the laminated coil component 1 described above, and thus will be omitted from description.

The coil conductor Q16 has a U shape and is provided on a main surface of the insulating layer P16.

The coil conductor Q16 has a land portion Ra16 and a land portion Rd16 at different end portions. Further, the coil conductor Q16 has a bent portion Ub16 and a bent portion Uc16.

The land portion Ra16, the bent portion Ub16, the bent portion Uc16, and the land portion Rd16 are connected to a via conductor Sa16, a via conductor Sb16, a via conductor Sc16, and a via conductor Sd16 penetrating the insulating layer P16 in the length direction L, respectively.

The coil conductor Q17 has a U shape and is provided on a main surface of the insulating layer P17.

The coil conductor Q17 has a land portion Rc17 and a land portion Rd17 at different end portions. Further, the coil conductor Q17 has a bent portion Ua17 and a bent portion Ub17.

The bent portion Ua17, the bent portion Ub17, the land portion Rc17, and the land portion Rd17 are connected to a via conductor Sa17, a via conductor Sb17, a via conductor Sc17, and a via conductor Sd17 penetrating the insulating layer P17 in the length direction L, respectively.

The coil conductor Q18 has a U shape and is provided on a main surface of the insulating layer P18.

The coil conductor Q18 has a land portion Rb18 and a land portion Rc18 at different end portions. Further, the coil conductor Q18 has a bent portion Ua18 and a bent portion Ud18.

The bent portion Ua18, the land portion Rb18, the land portion Rc18, and the bent portion Ud18 are connected to a via conductor Sa18, a via conductor Sb18, a via conductor Sc18, and a via conductor Sd18 penetrating the insulating layer P18 in the length direction L, respectively.

The coil conductor Q19 has a U shape and is provided on a main surface of the insulating layer P19.

The coil conductor Q19 has a land portion Ra19 and a land portion Rb19 at different end portions. The coil conductor Q19 has a bent portion Uc19 and a bent portion Ud19.

The land portion Ra19, the land portion Rb19, the bent portion Uc19, and the bent portion Ud19 are connected to a via conductor Sa19, a via conductor Sb19, a via conductor Sc19, and a via conductor Sd19 penetrating the insulating layer P19 in the length direction L, respectively.

The coil conductor Q20 has a U shape and is provided on a main surface of the insulating layer P20.

The coil conductor Q20 has a land portion Rc20 and a land portion Rd20 at different end portions. Further, the coil conductor Q20 has a bent portion Ua20 and a bent portion Ub20.

The bent portion Ua20, the bent portion Ub20, and the land portion Rd20 are connected to a via conductor Sa20, a via conductor Sb20, and a via conductor Sd20 penetrating the insulating layer P20 in the length direction L, respectively.

The coil conductor Q21 has a U shape and is provided on a main surface of the insulating layer P21.

The coil conductor Q21 has a land portion Ra21 and a land portion Rd21 at different end portions. Further, the coil conductor Q21 has a bent portion Ub21 and a bent portion Uc21.

The land portion Ra21, the bent portion Ub21, and the bent portion Uc21 are connected to a via conductor Sa21, a via conductor Sb21, and a via conductor Sc21 that penetrate the insulating layer P21 in the length direction L, respectively.

The coil conductor Q22 has a U shape and is provided on a main surface of the insulating layer P22.

The coil conductor Q22 has a land portion Ra22 and a land portion Rd22 at different end portions. The coil conductor Q22 has a bent portion Ub22 and a bent portion Uc22.

The land portion Ra22, the bent portion Ub22, the bent portion Uc22, and the land portion Rd22 are connected to a via conductor Sa22, a via conductor Sb22, a via conductor Sc22, and a via conductor Sd22 penetrating the insulating layer P22 in the length direction L, respectively.

The coil conductor Q23 has a U shape and is provided on a main surface of the insulating layer P23.

The coil conductor Q23 has a land portion Ra23 and a land portion Rb23 at different end portions. The coil conductor Q23 has a bent portion Uc23 and a bent portion Ud23.

The land portion Rb23, the bent portion Uc23, and the bent portion Ud23 are connected to a via conductor Sb23, a via conductor Sc23, and a via conductor Sd23 penetrating the insulating layer P23 in the length direction L, respectively.

The coil conductor Q24 has a U shape and is provided on a main surface of the insulating layer P24.

The coil conductor Q24 has a land portion Rb24 and a land portion Rc24 at different end portions. Further, the coil conductor Q24 has a bent portion Ua24 and a bent portion Ud24.

The bent portion Ua24, the land portion Rc24, and the bent portion Ud24 are connected to a via conductor Sa24, a via conductor Sc24, and a via conductor Sd24 penetrating the insulating layer P24 in the length direction L, respectively.

The coil conductor Q25 has an L shape and is provided on a main surface of the insulating layer P25.

The coil conductor Q25 has a land portion Rb25 and a land portion Rd25 at different end portions. Further, the coil conductor Q25 has a bent portion Ua25.

The bent portion Ua25, the land portion Rb25, and the land portion Rd25 are connected to a via conductor Sa25, a via conductor Sb25, and a via conductor Sd25 penetrating the insulating layer P25 in the length direction L, respectively.

In the laminated coil component 2, a plurality of coil conductors laminated in the length direction L include a first laminated portion Ea2, a second laminated portion Fa2, and an intermediate portion Ga2.

The first laminated portion Ea2 includes four of the coil conductors Q3, Q16, Q4, and Q5 adjacent to each other.

The first laminated portion Ea2 has a first parallel section Ma2 in which all the coil conductors constituting the first laminated portion Ea2, that is, the coil conductor Q3, the coil conductor Q16, the coil conductor Q4, and the coil conductor Q5 overlap each other when viewed from the length direction L.

The first parallel sections Ma2 are connected in parallel by the via conductor Sc16, the via conductor Sd16, the via conductor Sc4, the via conductor Sd4, the via conductor Sc5, and the via conductor Sd5. That is, the coil conductor Q3, the coil conductor Q16, the coil conductor Q4, and the coil conductor Q5 are connected in parallel in the first parallel section Ma2.

All of the coil conductor Q3, the coil conductor Q16, the coil conductor Q4, and the coil conductor Q5 do not overlap each other when viewed from the length direction L in a section other than the first parallel section Ma2.

The second laminated portion Fa2 includes four of the coil conductors Q7, Q8, Q9, and Q18 adjacent to each other which are as many as the coil conductors in the first laminated portion Ea2 (i.e., a number of the coil conductors Q7, Q8, Q9 and Q18 in the second laminated portion Fa2 is the same as the number of the coil conductors Q3, Q4, Q5 and Q16 in the first laminated portion Ea2).

The second laminated portion Fa2 has a second parallel section Na2 in which all the coil conductors constituting the second laminated portion Fa2, that is, the coil conductor Q7, the coil conductor Q8, the coil conductor Q9, and the coil conductor Q18 overlap each other when viewed from the length direction L.

The second parallel sections Na2 are connected in parallel by the via conductor Sc8, the via conductor Sd8, the via conductor Sc9, the via conductor Sd9, the via conductor Sc18, and the via conductor Sd18. That is, the coil conductor Q7, the coil conductor Q8, the coil conductor Q9, and the coil conductor Q18 are connected in parallel in the second parallel section Na2.

All of the coil conductor Q7, the coil conductor Q8, the coil conductor Q9, and the coil conductor Q18 do not all overlap each other when viewed from the length direction L in a section other than the second parallel section Na2.

The first parallel section Ma2 and the second parallel section Na2 overlap each other when viewed from the length direction L.

The intermediate portion Ga2 is adjacent to the first laminated portion Ea2 and the second laminated portion Fa2 between both of the laminated portions, and includes two of the coil conductors Q6 and Q17.

All the coil conductors constituting the intermediate portion Ga2, that is, the coil conductor Q6 and the coil conductor Q17 do not overlap each part of the first parallel section Ma2 and the second parallel section Na2 when viewed from the length direction L. More specifically, the coil conductor Q6 and the coil conductor Q17 do not overlap a region (region surrounded by a broken line) other than both ends (including a connection portion where a coil conductor and a via conductor are connected) of the first parallel section Ma2 and a region (region surrounded by a broken line) other than both ends (including a connection portion where a coil conductor and a via conductor are connected) of the second parallel section Na2 when viewed from the length direction L.

Therefore, in the laminated coil component 2, when viewed from the length direction L, between the first parallel section Ma2 and the second parallel section Na2, a region where no coil conductor is present exists only for two layers in terms of insulating layers.

In the laminated coil component 2, a plurality of coil conductors laminated in the length direction L include a first laminated portion Eb2, a second laminated portion Fb2, and an intermediate portion Gb2.

Similarly to the second laminated portion Fa2, the first laminated portion Eb2 includes four of the coil conductors Q7, Q8, Q9, and Q18 adjacent to each other.

The first laminated portion Eb2 has a first parallel section Mb2 in which all the coil conductors constituting the first laminated portion Eb2, that is, the coil conductor Q7, the coil conductor Q8, the coil conductor Q9, and the coil conductor Q18 overlap each other when viewed from the length direction L.

The first parallel sections Mb2 are connected in parallel by the via conductor Sc8, the via conductor Sd8, the via conductor Sc9, the via conductor Sd9, the via conductor Sc18, and the via conductor Sd18. That is, the coil conductor Q7, the coil conductor Q8, the coil conductor Q9, and the coil conductor Q18 are connected in parallel in the first parallel section Mb2.

All of the coil conductor Q7, the coil conductor Q8, the coil conductor Q9, and the coil conductor Q18 do not overlap each other when viewed from the length direction L in a section other than the first parallel section Mb2.

The second laminated portion Fb2 includes four of the coil conductors Q11, Q12, Q19, and Q13 adjacent to each other which are as many as the coil conductors in the first laminated portion Eb2 (i.e., a number of the coil conductors Q11, Q12, Q13 and Q19 in the second laminated portion Fb2 is the same as the number of the coil conductors Q7, Q8, Q9 and Q18 in the first laminated portion Eb2).

The second laminated portion Fb2 has a second parallel section Nb2 in which all the coil conductors constituting the second laminated portion Fb2, that is, the coil conductor Q11, the coil conductor Q12, the coil conductor Q19, and the coil conductor Q13 overlap each other when viewed from the length direction L.

The second parallel sections Nb2 are connected in parallel by the via conductor Sc12, the via conductor Sd12, the via conductor Sc19, the via conductor Sd19, the via conductor Sc13, and the via conductor Sd13. That is, the coil conductor Q11, the coil conductor Q12, the coil conductor Q19, and the coil conductor Q13 are connected in parallel in the second parallel section Nb2.

All of the coil conductor Q11, the coil conductor Q12, the coil conductor Q19, and the coil conductor Q13 do not overlap each other when viewed from the length direction L in a section other than the second parallel section Nb2.

The first parallel section Mb2 and the second parallel section Nb2 overlap each other when viewed from the length direction L.

The intermediate portion Gb2 is adjacent to the first laminated portion Eb2 and the second laminated portion Fb2 between both the laminated portions and includes one of the coil conductor Q10.

All the coil conductors constituting the intermediate portion Gb2, that is, the coil conductor Q10 does not overlap each part of the first parallel section Mb2 and the second parallel section Nb2 when viewed from the length direction L. More specifically, the coil conductor Q10 does not overlap a region (region surrounded by a broken line) other than both ends (including a connection portion where a coil conductor and a via conductor are connected) of the first parallel section Mb2 and a region (region surrounded by a broken line) other than both ends (including a connection portion where a coil conductor and a via conductor are connected) of the second parallel section Nb2 when viewed from the length direction L.

Therefore, in the laminated coil component 2, when viewed from the length direction L, between the first parallel section Mb2 and the second parallel section Nb2, a region where no coil conductor is present exists only for one layer in terms of an insulating layer.

In the above description, in the laminated coil component 2, the first laminated portion Ea2, the first laminated portion Eb2, the second laminated portion Fa2, and the second laminated portion Fb2 are exemplified as laminated portions including four coil conductors adjacent to each other, but the same applies to laminated portions including another combination of four coil conductors adjacent to each other. That is, in the laminated coil component 2, four coil conductors adjacent to each other are connected in parallel in a parallel section in which the coil conductors overlap each other when viewed from the length direction L.

In the above description, in the laminated coil component 2, the combination of the first laminated portion Ea2, the second laminated portion Fa2, and the intermediate portion Ga2 and the combination of the first laminated portion Eb2, the second laminated portion Fb2, and the intermediate portion Gb2 are exemplified, but the same applies to another combination. That is, in the laminated coil component 2, when viewed from the length direction L, a region where no coil conductor is present exists only for one layer or two layers in terms of insulating layers between the first parallel section and the second parallel section. For this reason, in the laminated coil component 2, density is less likely to be locally lowered, and as a result, defects such as a crack are less likely to occur in the element body 10B.

The laminated coil component 2 is produced in the same manner as the laminated coil component 1 except that, for example, conductor patterns corresponding to the coil conductors, the via conductors, the lead-out land portions, and the lead-out via conductors illustrated in FIGS. 6 and 7 are formed on the coil sheet and the via sheet in the <Formation process of conductor pattern>, and further, the coil sheet and the via sheet are laminated in the lamination direction (the length direction L in FIGS. 6 and 7) in the order corresponding to FIGS. 6 and 7 in the <Producing process of laminate block>.

Third Embodiment

In the laminated coil component according to a third embodiment of the present disclosure, each of the first laminated portion and the second laminated portion includes five coil conductors adjacent to each other. The laminated coil component of the third embodiment of the present disclosure is the same as the laminated coil component of the first embodiment of the present disclosure except for this point.

Figure 8:
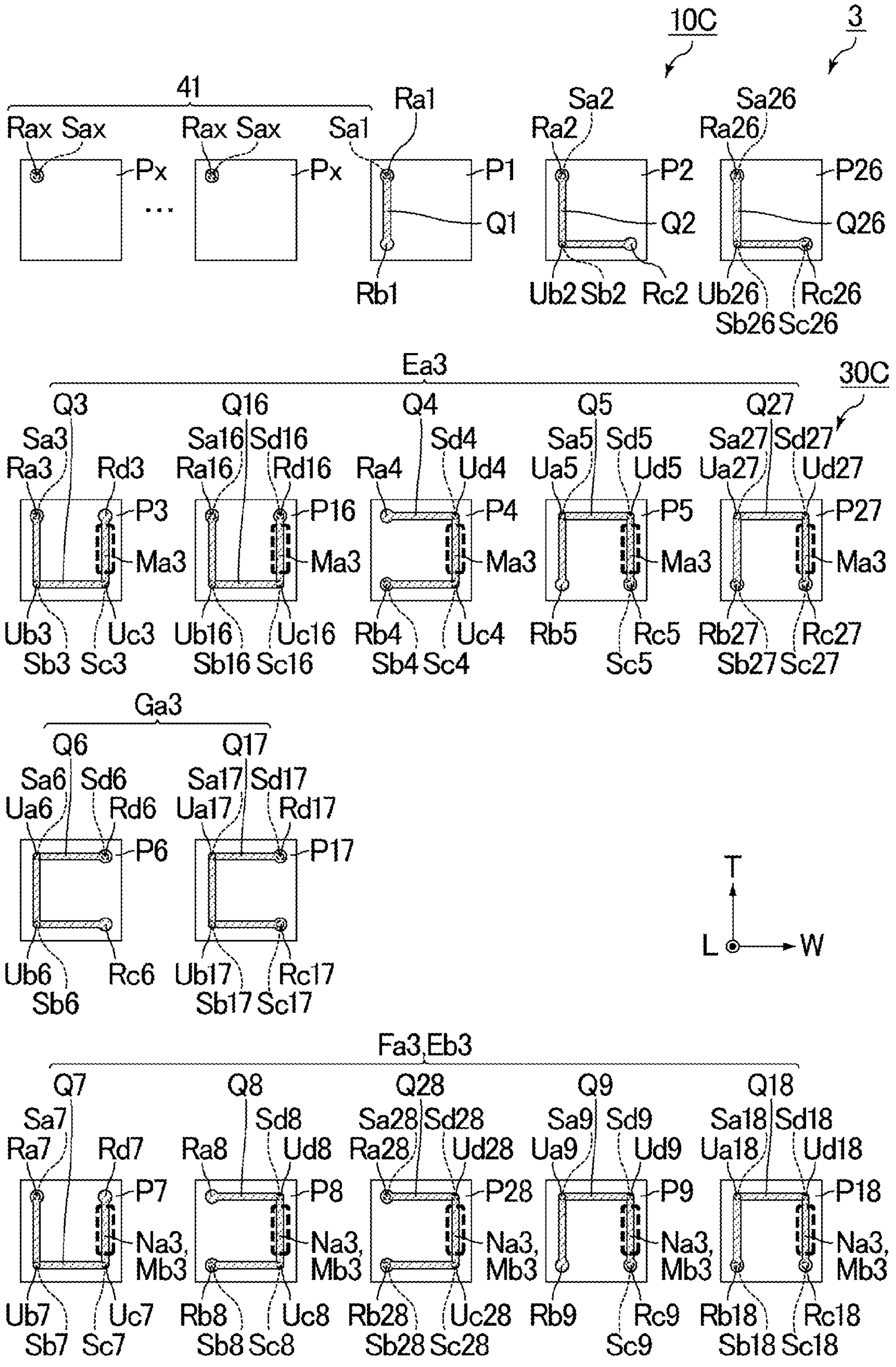
FIG. 8 is a schematic plan view illustrating an example of a state in which the laminated coil component (where an external electrode is excluded) according to a third embodiment of the present disclosure is disassembled.
Figure 9:
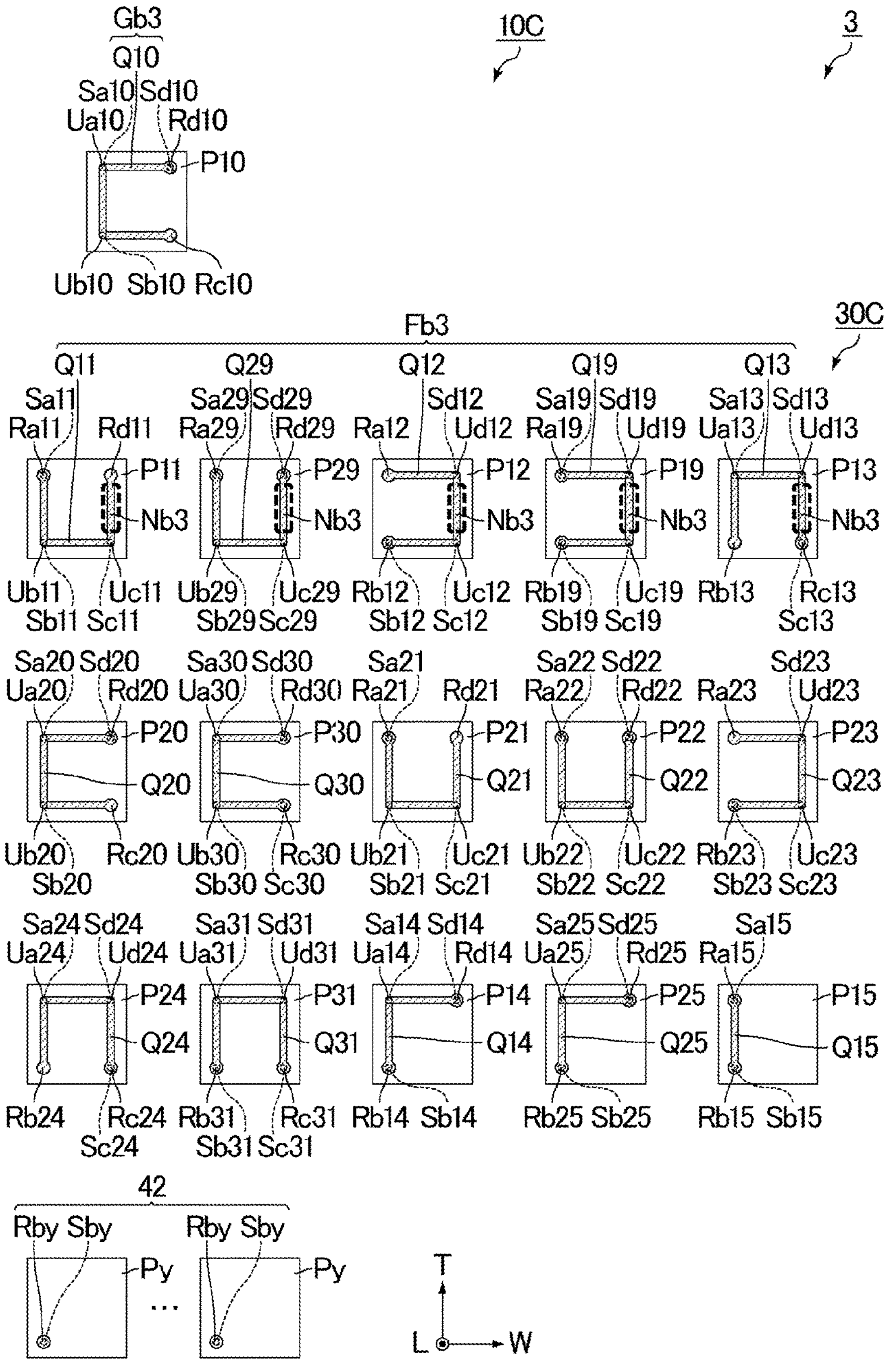
FIG. 9 is a schematic plan view illustrating an example of a state in which the laminated coil component (where an external electrode is excluded) according to the third embodiment of the present disclosure is disassembled, and illustrating a portion continuous with FIG. 8.

FIG. 8 is a schematic plan view illustrating an example of a state in which the laminated coil component (where an external electrode is excluded) according to the third embodiment of the present disclosure is disassembled. FIG. 9 is a schematic plan view illustrating an example of a state in which the laminated coil component (where an external electrode is excluded) according to the third embodiment of the present disclosure is disassembled, and illustrating a portion continuous with FIG. 8.

In the laminated coil component 3 illustrated in FIGS. 8 and 9, in the element body 10C, the insulating layer Px, the insulating layer P1, the insulating layer P2, an insulating layer P26, the insulating layer P3, the insulating layer P16, the insulating layer P4, the insulating layer P5, an insulating layer P27, the insulating layer P6, the insulating layer P17, the insulating layer P7, the insulating layer P8, an insulating layer P28, the insulating layer P9, the insulating layer P18, the insulating layer P10, the insulating layer P11, an insulating layer P29, the insulating layer P12, the insulating layer P19, the insulating layer P13, the insulating layer P20, an insulating layer P30, the insulating layer P21, the insulating layer P22, the insulating layer P23, the insulating layer P24, an insulating layer P31, the insulating layer P14, the insulating layer P25, the insulating layer P15, and the insulating layer Py are laminated in order in the length direction L. In the element body 10C, the insulating layer P26, the insulating layer P27, the insulating layer P28, the insulating layer P29, the insulating layer P30, and the insulating layer P31 are additionally provided at the above-described positions with respect to the element body 10B.

A coil 30C is provided inside the element body 10C.

As illustrated in FIGS. 8 and 9, the coil 30C includes the coil conductor Q1, the coil conductor Q2, a coil conductor Q26, the coil conductor Q3, the coil conductor Q16, the coil conductor Q4, the coil conductor Q5, a coil conductor Q27, the coil conductor Q6, the coil conductor Q17, the coil conductor Q7, the coil conductor Q8, a coil conductor Q28, the coil conductor Q9, the coil conductor Q18, the coil conductor Q10, the coil conductor Q11, a coil conductor Q29, the coil conductor Q12, the coil conductor Q19, the coil conductor Q13, the coil conductor Q20, a coil conductor Q30, the coil conductor Q21, the coil conductor Q22, the coil conductor Q23, the coil conductor Q24, a coil conductor Q31, the coil conductor Q14, the coil conductor Q25, and the coil conductor Q15 in order in the length direction L. In the coil 30C, the coil conductor Q26, the coil conductor Q27, the coil conductor Q28, the coil conductor Q29, the coil conductor Q30, and the coil conductor Q31 are additionally provided at the above-described positions with respect to the coil 30B.

Hereinafter, the insulating layers and the coil conductors newly provided in the laminated coil component 3 will be described. Note that a connection relationship between coil conductors adjacent to each other in the laminated coil component 3 is clear with reference to FIGS. 8 and 9 in accordance with the laminated coil component 1 described above, and thus will be omitted from description.

The coil conductor Q26 has an L shape and is provided on a main surface of the insulating layer P26.

The coil conductor Q26 has a land portion Ra26 and a land portion Rc26 at different end portions. Further, the coil conductor Q26 has a bent portion Ub26.

The land portion Ra26, the bent portion Ub26, and the land portion Rc26 are connected to a via conductor Sa26, a via conductor Sb26, and a via conductor Sc26 penetrating the insulating layer P26 in the length direction L, respectively.

The coil conductor Q27 has a U shape and is provided on a main surface of the insulating layer P27.

The coil conductor Q27 has a land portion Rb27 and a land portion Rc27 at different end portions. Further, the coil conductor Q27 has a bent portion Ua27 and a bent portion Ud27.

The bent portion Ua27, the land portion Rb27, the land portion Rc27, and the bent portion Ud27 are connected to a via conductor Sa27, a via conductor Sb27, a via conductor Sc27, and a via conductor Sd27 penetrating the insulating layer P27 in the length direction L, respectively.

The coil conductor Q28 has a U shape and is provided on a main surface of the insulating layer P28.

The coil conductor Q28 has a land portion Ra28 and a land portion Rb28 at different end portions. Further, the coil conductor Q28 has a bent portion Uc28 and a bent portion Ud28.

The land portion Ra28, the land portion Rb28, the bent portion Uc28, and the bent portion Ud28 are connected to a via conductor Sa28, a via conductor Sb28, a via conductor Sc28, and a via conductor Sd28 penetrating the insulating layer P28 in the length direction L, respectively.

The coil conductor Q29 has a U shape and is provided on a main surface of the insulating layer P29.

The coil conductor Q29 has a land portion Ra29 and a land portion Rd29 at different end portions. Further, the coil conductor Q29 has a bent portion Ub29 and a bent portion Uc29.

The land portion Ra29, the bent portion Ub29, the bent portion Uc29, and the land portion Rd29 are connected to a via conductor Sa29, a via conductor Sb29, a via conductor Sc29, and a via conductor Sd29 penetrating the insulating layer P29 in the length direction L, respectively.

The coil conductor Q30 has a U shape and is provided on a main surface of the insulating layer P30.

The coil conductor Q30 has a land portion Rc30 and a land portion Rd30 at different end portions. Further, the coil conductor Q30 has a bent portion Ua30 and a bent portion Ub30.

The bent portion Ua30, the bent portion Ub30, the land portion Rc30, and the land portion Rd30 are connected to a via conductor Sa30, a via conductor Sb30, a via conductor Sc30, and a via conductor Sd30 penetrating the insulating layer P30 in the length direction L, respectively.

The coil conductor Q31 has a U shape and is provided on a main surface of the insulating layer P31.

The coil conductor Q31 has a land portion Rb31 and a land portion Rc31 at different end portions. The coil conductor Q31 has a bent portion Ua31 and a bent portion Ud31.

The bent portion Ua31, the land portion Rb31, the land portion Rc31, and the bent portion Ud31 are connected to a via conductor Sa31, a via conductor Sb31, a via conductor Sc31, and a via conductor Sd31 penetrating the insulating layer P31 in the length direction L, respectively.

In the laminated coil component 3, a plurality of coil conductors laminated in the length direction L include a first laminated portion Ea3, a second laminated portion Fa3, and an intermediate portion Ga3.

The first laminated portion Ea3 includes five of the coil conductors Q3, Q16, Q4, Q5, and Q27 adjacent to each other.

The first laminated portion Ea3 has a first parallel section Ma3 in which all the coil conductors constituting the first laminated portion Ea3, that is, the coil conductor Q3, the coil conductor Q16, the coil conductor Q4, the coil conductor Q5, and the coil conductor Q27 overlap each other when viewed from the length direction L.

The first parallel sections Ma3 are connected in parallel by the via conductor Sc16, the via conductor Sd16, the via conductor Sc4, the via conductor Sd4, the via conductor Sc5, the via conductor Sd5, the via conductor Sc27, and the via conductor Sd27. That is, the coil conductor Q3, the coil conductor Q16, the coil conductor Q4, the coil conductor Q5, and the coil conductor Q27 are connected in parallel in the first parallel section Ma3.

All of the coil conductor Q3, the coil conductor Q16, the coil conductor Q4, the coil conductor Q5, and the coil conductor Q27 do not overlap each other when viewed from the length direction L in a section other than the first parallel section Ma3.

The second laminated portion Fa3 includes five of the coil conductors Q7, Q8, Q28, Q9, and Q18 adjacent to each other which are as many as the coil conductors in the first laminated portion Ea3 (i.e., a number of the coil conductors Q7, Q8, Q9, Q18 and Q28 in the second laminated portion Fa3 is the same as the number of the coil conductors Q3, Q4, Q5, Q16 and Q27 in the first laminated portion Ea3).

The second laminated portion Fa3 has a second parallel section Na3 in which all the coil conductors constituting the second laminated portion Fa3, that is, the coil conductor Q7, the coil conductor Q8, the coil conductor Q28, the coil conductor Q9, and the coil conductor Q18 overlap each other when viewed from the length direction L.

The second parallel sections Na3 are connected in parallel by the via conductor Sc8, the via conductor Sd8, the via conductor Sc28, the via conductor Sd28, the via conductor Sc9, the via conductor Sd9, the via conductor Sc18, and the via conductor Sd18. That is, the coil conductor Q7, the coil conductor Q8, the coil conductor Q28, the coil conductor Q9, and the coil conductor Q18 are connected in parallel in the second parallel section Na3.

All of the coil conductor Q7, the coil conductor Q8, the coil conductor Q28, the coil conductor Q9, and the coil conductor Q18 do not overlap each other when viewed from the length direction L in a section other than the second parallel section Na3.

The first parallel section Ma3 and the second parallel section Na3 overlap each other when viewed from the length direction L.

The intermediate portion Ga3 is adjacent to the first laminated portion Ea3 and the second laminated portion Fa3 between both of the laminated portions, and includes two of the coil conductors Q6 and Q17.

All the coil conductors constituting the intermediate portion Ga3, that is, the coil conductor Q6 and the coil conductor Q17 do not overlap each part of the first parallel section Ma3 and the second parallel section Na3 when viewed from the length direction L. More specifically, the coil conductor Q6 and the coil conductor Q17 do not overlap a region (region surrounded by a broken line) other than both ends (including a connection portion where a coil conductor and a via conductor are connected) of the first parallel section Ma3 and a region (region surrounded by a broken line) other than both ends (including a connection portion where a coil conductor and a via conductor are connected) of the second parallel section Na3 when viewed from the length direction L.

Therefore, in the laminated coil component 3, when viewed from the length direction L, between the first parallel section Ma3 and the second parallel section Na3, a region where no coil conductor is present exists only for two layers in terms of insulating layers.

In the laminated coil component 3, a plurality of coil conductors laminated in the length direction L include a first laminated portion Eb3, a second laminated portion Fb3, and an intermediate portion Gb3.

Similarly to the second laminated portion Fa3, the first laminated portion Eb3 includes five of the coil conductors Q7, Q8, Q28, Q9, and Q18 adjacent to each other.

The first laminated portion Eb3 has a first parallel section Mb3 in which all the coil conductors constituting the first laminated portion Eb3, that is, the coil conductor Q7, the coil conductor Q8, the coil conductor Q28, the coil conductor Q9, and the coil conductor Q18 overlap each other when viewed from the length direction L.

The first parallel sections Mb3 are connected in parallel by the via conductor Sc8, the via conductor Sd8, the via conductor Sc28, the via conductor Sd28, the via conductor Sc9, the via conductor Sd9, the via conductor Sc18, and the via conductor Sd18. That is, the coil conductor Q7, the coil conductor Q8, the coil conductor Q28, the coil conductor Q9, and the coil conductor Q18 are connected in parallel in the first parallel section Mb3.

All of the coil conductor Q7, the coil conductor Q8, the coil conductor Q28, the coil conductor Q9, and the coil conductor Q18 do not overlap each other when viewed from the length direction L in a section other than the first parallel section Mb3.

The second laminated portion Fb3 includes five of the coil conductors Q11, Q29, Q12, Q19, and Q13 adjacent to each other which are as many as the coil conductors in the first laminated portion Eb3 (i.e., a number of the coil conductors Q11, Q12, Q13 and Q29 in the second laminated portion Fb3 is the same as the number of the coil conductors Q7, Q8, Q9, Q18 and Q28 in the first laminated portion Eb3).

The second laminated portion Fb3 has a second parallel section Nb3 in which all the coil conductors constituting the second laminated portion Fb3, that is, the coil conductor Q11, the coil conductor Q29, the coil conductor Q12, the coil conductor Q19, and the coil conductor Q13 overlap each other when viewed from the length direction L.

The second parallel sections Nb3 are connected in parallel by the via conductor Sc29, the via conductor Sd29, the via conductor Sc12, the via conductor Sd12, the via conductor Sc19, the via conductor Sd19, the via conductor Sc13, and the via conductor Sd13. That is, the coil conductor Q11, the coil conductor Q29, the coil conductor Q12, the coil conductor Q19, and the coil conductor Q13 are connected in parallel in the second parallel section Nb3.

All of the coil conductor Q11, the coil conductor Q29, the coil conductor Q12, the coil conductor Q19, and the coil conductor Q13 do not overlap each other when viewed from the length direction L in a section other than the second parallel section Nb3.

The first parallel section Mb3 and the second parallel section Nb3 overlap each other when viewed from the length direction L.

The intermediate portion Gb3 is adjacent to the first laminated portion Eb3 and the second laminated portion Fb3 between both of the laminated portions, and includes one of the coil conductor Q10.

All the coil conductors constituting the intermediate portion Gb3, that is, the coil conductor Q10 does not overlap each part of the first parallel section Mb3 and the second parallel section Nb3 when viewed from the length direction L. More specifically, the coil conductor Q10 does not overlap a region (region surrounded by a broken line) other than both ends (including a connection portion where a coil conductor and a via conductor are connected) of the first parallel section Mb3 and a region (region surrounded by a broken line) other than both ends (including a connection portion where a coil conductor and a via conductor are connected) of the second parallel section Nb3 when viewed from the length direction L.

Therefore, in the laminated coil component 3, when viewed from the length direction L, between the first parallel section Mb3 and the second parallel section Nb3, a region where no coil conductor is present exists only for one layer in terms of an insulating layer.

In the above description, in the laminated coil component 3, the first laminated portion Ea3, the first laminated portion Eb3, the second laminated portion Fa3, and the second laminated portion Fb3 are exemplified as laminated portions including five coil conductors adjacent to each other, but the same applies to laminated portions including another combination of five coil conductors adjacent to each other. That is, in the laminated coil component 3, five coil conductors adjacent to each other are connected in parallel in a parallel section in which the coil conductors overlap each other when viewed from the length direction L.

In the above description, in the laminated coil component 3, the combination of the first laminated portion Ea3, the second laminated portion Fa3, and the intermediate portion Ga3 and the combination of the first laminated portion Eb3, the second laminated portion Fb3, and the intermediate portion Gb3 are described, but the same applies to another combination. That is, in the laminated coil component 3, when viewed from the length direction L, a region where no coil conductor is present exists only for one layer or two layers in terms of insulating layers between the first parallel section and the second parallel section. For this reason, in the laminated coil component 3, density is less likely to be locally lowered, and as a result, defects such as a crack are less likely to occur in the element body 10C.

The laminated coil component 3 is manufactured in the same manner as the laminated coil component 1 except that, for example, conductor patterns corresponding to the coil conductors, the via conductors, the lead-out land portions, and the lead-out via conductors illustrated in FIGS. 8 and 9 are formed on the coil sheet and the via sheet in the <Formation process of conductor pattern>, and further, the coil sheet and the via sheet are laminated in the lamination direction (the length direction L in FIGS. 8 and 9) in the order corresponding to FIGS. 8 and 9 in the <Producing process of laminate block>.

Fourth Embodiment

In the laminated coil component according to a fourth embodiment of the present disclosure, each of the first laminated portion and the second laminated portion includes six coil conductors adjacent to each other. The laminated coil component of the fourth embodiment of the present disclosure is the same as the laminated coil component of the first embodiment of the present disclosure except for this point.

Figure 10:
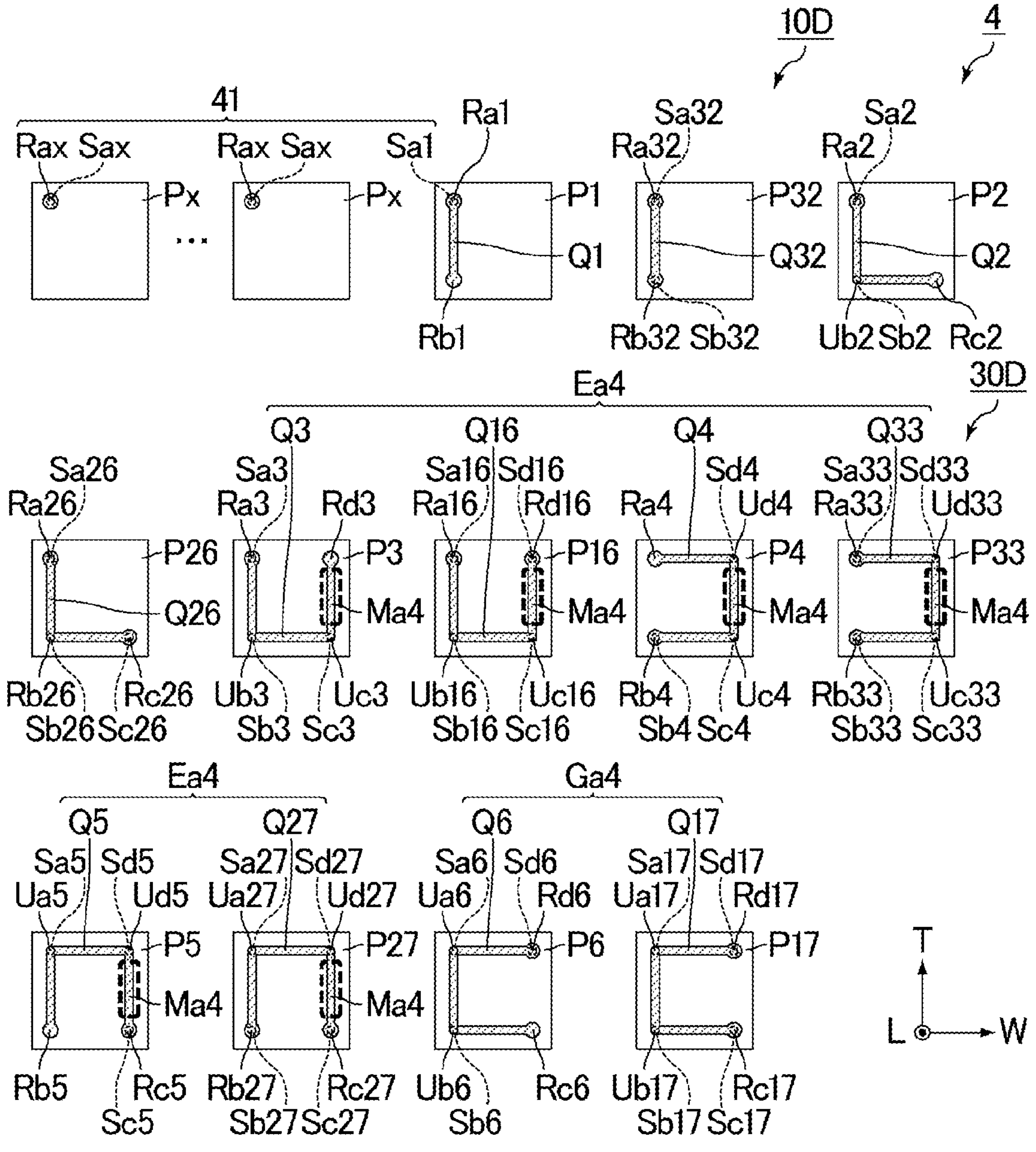
FIG. 10 is a schematic plan view illustrating an example of a state in which the laminated coil component (where an external electrode is excluded) according to a fourth embodiment of the present disclosure is disassembled.
Figure 11:
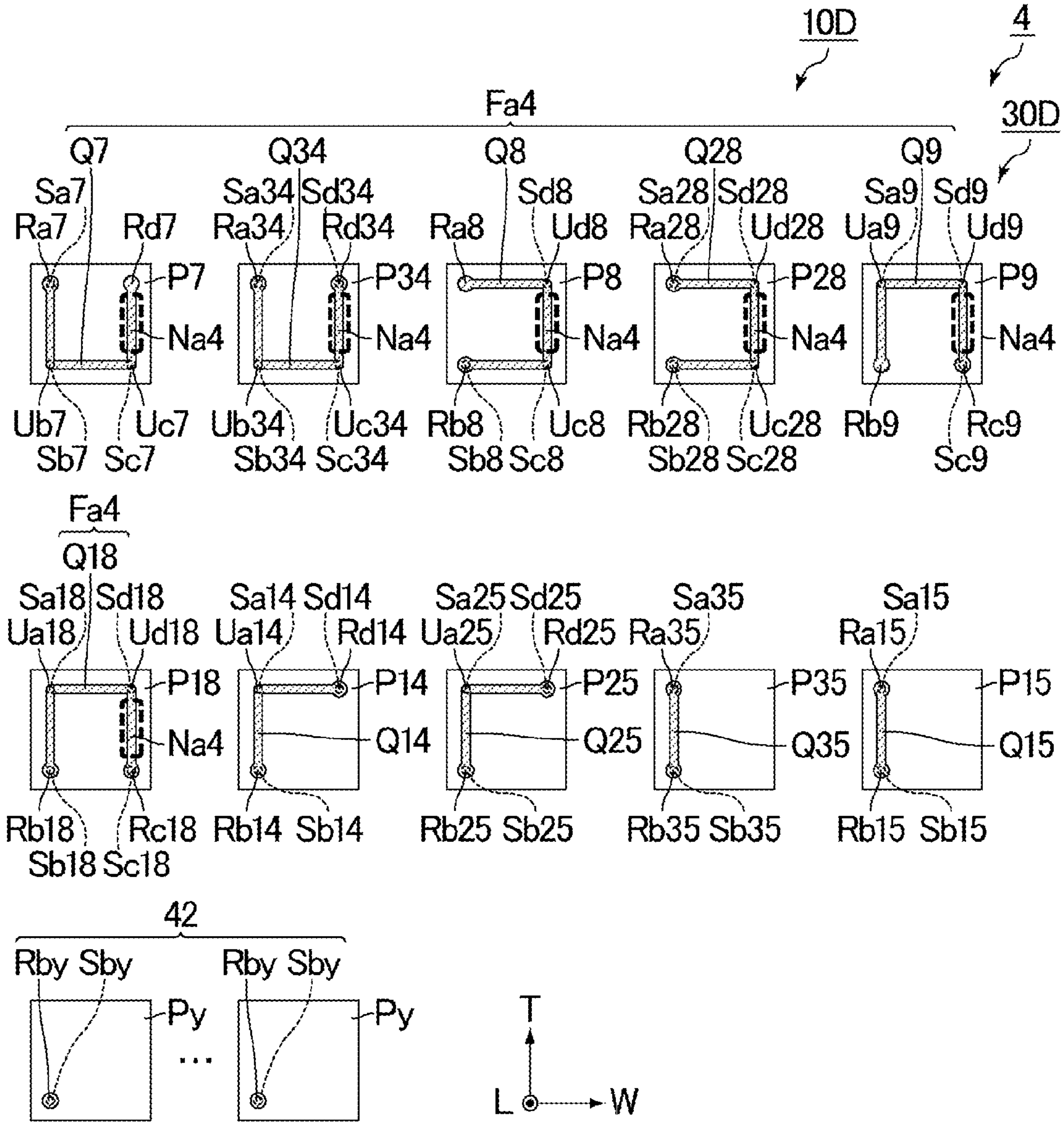
FIG. 11 is a schematic plan view illustrating an example of a state in which the laminated coil component (where an external electrode is excluded) according to the fourth embodiment of the present disclosure is disassembled, and illustrating a portion continuous with FIG. 10.

FIG. 10 is a schematic plan view illustrating an example of a state in which the laminated coil component (where an external electrode is excluded) according to the fourth embodiment of the present disclosure is disassembled. FIG. 11 is a schematic plan view illustrating an example of a state in which the laminated coil component (where an external electrode is excluded) according to the fourth embodiment of the present disclosure is disassembled, and illustrating a portion continuous with FIG. 10.

In a laminated coil component 4 illustrated in FIGS. 10 and 11, in an element body 10D, the insulating layer Px, the insulating layer P1, an insulating layer P32, the insulating layer P2, the insulating layer P26, the insulating layer P3, the insulating layer P16, the insulating layer P4, an insulating layer P33, the insulating layer P5, the insulating layer P27, the insulating layer P6, the insulating layer P17, the insulating layer P7, an insulating layer P34, the insulating layer P8, the insulating layer P28, the insulating layer P9, the insulating layer P18, the insulating layer P14, the insulating layer P25, an insulating layer P35, the insulating layer P15, and the insulating layer Py are laminated in order in the length direction L. In the element body 10D, the insulating layer P10, the insulating layer P11, the insulating layer P29, the insulating layer P12, the insulating layer P19, the insulating layer P13, the insulating layer P20, the insulating layer P30, the insulating layer P21, the insulating layer P22, the insulating layer P23, the insulating layer P24, and the insulating layer P31 are removed from the element body 10C, and then the insulating layer P32, the insulating layer P33, the insulating layer P34, and the insulating layer P35 are additionally provided at the above-described positions. A coil 30D is provided inside the element body 10D.

As illustrated in FIGS. 10 and 11, the coil 30D includes the coil conductor Q1, a coil conductor Q32, the coil conductor Q2, the coil conductor Q26, the coil conductor Q3, the coil conductor Q16, the coil conductor Q4, a coil conductor Q33, the coil conductor Q5, the coil conductor Q27, the coil conductor Q6, the coil conductor Q17, the coil conductor Q7, a coil conductor Q34, the coil conductor Q8, the coil conductor Q28, the coil conductor Q9, the coil conductor Q18, the coil conductor Q14, the coil conductor Q25, a coil conductor Q35, and the coil conductor Q15 in order in the length direction L. In the coil 30D, the coil conductor Q10, the coil conductor Q11, the coil conductor Q29, the coil conductor Q12, the coil conductor Q19, the coil conductor Q13, the coil conductor Q20, the coil conductor Q30, the coil conductor Q21, the coil conductor Q22, the coil conductor Q23, the coil conductor Q24, and the coil conductor Q31 are removed from the coil 30C, and the coil conductor Q32, the coil conductor Q33, the coil conductor Q34, and the coil conductor Q35 are additionally provided at the above-described positions.

Hereinafter, the insulating layers and the coil conductors newly provided in the laminated coil component 4 will be described. Note that a connection relationship between coil conductors adjacent to each other in the laminated coil component 4 is clear with reference to FIGS. 10 and 11 in accordance with the laminated coil component 1 described above, and thus will be omitted from description.

The coil conductor Q32 has a linear shape and is provided on a main surface of the insulating layer P32.

The coil conductor Q32 has a land portion Ra32 and a land portion Rb32 at different end portions.

The land portion Ra32 and the land portion Rb32 are connected to a via conductor Sa32 and a via conductor Sb32 penetrating the insulating layer P32 in the length direction L, respectively.

The coil conductor Q33 has a U shape and is provided on a main surface of the insulating layer P33.

The coil conductor Q33 has a land portion Ra33 and a land portion Rb33 at different end portions. Further, the coil conductor Q33 has a bent portion Uc33 and a bent portion Ud33.

The land portion Ra33, the land portion Rb33, the bent portion Uc33, and the bent portion Ud33 are connected to a via conductor Sa33, a via conductor Sb33, a via conductor Sc33, and a via conductor Sd33 penetrating the insulating layer P33 in the length direction L, respectively.

The coil conductor Q34 has a U shape and is provided on a main surface of the insulating layer P34.

The coil conductor Q34 has a land portion Ra34 and a land portion Rd34 at different end portions. Further, the coil conductor Q34 has a bent portion Ub34 and a bent portion Uc34.

The land portion Ra34, the bent portion Ub34, the bent portion Uc34, and the land portion Rd34 are connected to ae via conductor Sa34, a via conductor Sb34, a via conductor Sc34, and a via conductor Sd34 penetrating the insulating layer P34 in the length direction L, respectively.

The coil conductor Q35 has a linear shape and is provided on a main surface of the insulating layer P35.

The coil conductor Q35 has a land portion Ra35 and a land portion Rb35 at different end portions.

The land portion Ra35 and the land portion Rb35 are connected to a via conductor Sa35 and a via conductor Sb35 penetrating the insulating layer P35 in the length direction L, respectively.

In the laminated coil component 4, a plurality of coil conductors laminated in the length direction L includes a first laminated portion Ea4, a second laminated portion Fa4, and an intermediate portion Ga4.

The first laminated portion Ea4 includes six of the coil conductors Q3, Q16, Q4, Q33, Q5, and Q27 adjacent to each other.

The first laminated portion Ea4 has a first parallel section Ma4 in which all the coil conductors constituting the first laminated portion Ea4, that is, the coil conductor Q3, the coil conductor Q16, the coil conductor Q4, the coil conductor Q33, the coil conductor Q5, and the coil conductor Q27 overlap each other when viewed from the length direction L.

The first parallel sections Ma4 are connected in parallel by the via conductor Sc16, the via conductor Sd16, the via conductor Sc4, the via conductor Sd4, the via conductor Sc33, the via conductor Sd33, the via conductor Sc5, the via conductor Sd5, the via conductor Sc27, and the via conductor Sd27. That is, the coil conductor Q3, the coil conductor Q16, the coil conductor Q4, the coil conductor Q33, the coil conductor Q5, and the coil conductor Q27 are connected in parallel in the first parallel section Ma4.

All of the coil conductor Q3, the coil conductor Q16, the coil conductor Q4, the coil conductor Q33, the coil conductor Q5, and the coil conductor Q27 do not overlap each other when viewed from the length direction L in a section other than the first parallel section Ma4.

The second laminated portion Fa4 includes six of the coil conductors Q7, Q34, Q8, coil conductors Q28, Q9, and Q18 adjacent to each other which are as many as the coil conductors in the first laminated portion Ea4 (i.e., a number of the coil conductors Q7, Q8, Q9. Q18, Q28 and Q34 in the second laminated portion Fa4 is the same as the number of the coil conductors Q3, Q4, Q5, Q16, Q27 and Q33 in the first laminated portion Ea4).

The second laminated portion Fa4 has a second parallel section Na4 in which all the coil conductors constituting the second laminated portion Fa4, that is, the coil conductor Q7, the coil conductor Q34, the coil conductor Q8, the coil conductor Q28, the coil conductor Q9, and the coil conductor Q18 overlap each other when viewed from the length direction L.

The second parallel sections Na4 are connected in parallel by the via conductor Sc34, the via conductor Sd34, the via conductor Sc8, the via conductor Sd8, the via conductor Sc28, the via conductor Sd28, the via conductor Sc9, the via conductor Sd9, the via conductor Sc18, and the via conductor Sd18. That is, the coil conductor Q7, the coil conductor Q34, the coil conductor Q8, the coil conductor Q28, the coil conductor Q9, and the coil conductor Q18 are connected in parallel in the second parallel section Na4.

All of the coil conductor Q7, the coil conductor Q34, the coil conductor Q8, the coil conductor Q28, the coil conductor Q9, and the coil conductor Q18 do not overlap each other when viewed from the length direction L in a section other than the second parallel section Na4.

The first parallel section Ma4 and the second parallel section Na4 overlap each other when viewed from the length direction L.

The intermediate portion Ga4 is adjacent to the first laminated portion Ea4 and the second laminated portion Fa4 between both of the laminated portions, and includes two of the coil conductors Q6 and Q17.

All the coil conductors constituting the intermediate portion Ga4, that is, the coil conductor Q6 and the coil conductor Q17 do not overlap each part of the first parallel section Ma4 and the second parallel section Na4 when viewed from the length direction L. More specifically, the coil conductor Q6 and the coil conductor Q17 do not overlap a region (region surrounded by a broken line) other than both ends (including a connection portion where a coil conductor and a via conductor are connected) of the first parallel section Ma4 and a region (region surrounded by a broken line) other than both ends (including a connection portion where a coil conductor and a via conductor are connected) of the second parallel section Na4 when viewed from the length direction L.

Therefore, in the laminated coil component 4, when viewed from the length direction L, between the first parallel section Ma4 and the second parallel section Na4, a region where no coil conductor is present exists only for two layers in terms of insulating layers.

In the above description, in the laminated coil component 4, the first laminated portion Ea4 and the second laminated portion Fa4 are exemplified as laminated portions including six coil conductors adjacent to each other, but the same applies to laminated portions including another combination of six coil conductors adjacent to each other. That is, in the laminated coil component 4, six coil conductors adjacent to each other are connected in parallel in a parallel section in which the coil conductors overlap each other when viewed from the length direction L.

In the above description, in the laminated coil component 4, a combination of the first laminated portion Ea4, the second laminated portion Fa4, and the intermediate portion Ga4 is described, but the same applies to another combination. That is, in the laminated coil component 4, when viewed from the length direction L, a region where no coil conductor is present exists only for two layers in terms of insulating layers between the first parallel section and the second parallel section. For this reason, in the laminated coil component 4, density is less likely to be locally lowered, and as a result, defects such as a crack are less likely to occur in the element body 10D.

The laminated coil component 4 is manufactured in the same manner as the laminated coil component 1 except that, for example, conductor patterns corresponding to the coil conductors, the via conductors, the lead-out land portions, and the lead-out via conductors illustrated in FIGS. 10 and 11 are formed on the coil sheet and the via sheet in the <Formation process of conductor pattern>, and further, the coil sheet and the via sheet are laminated in the lamination direction (the length direction L in FIGS. 10 and 11) in the order corresponding to FIGS. 10 and 11 in the <Producing process of laminate block>.

In the above embodiment, the modes in which the number of coil conductors connected in parallel in each of the first parallel section and the second parallel section is three, four, five, and six is exemplified, but the same applies to a mode in which the number of coil conductors connected in parallel in each of the first parallel section and the second parallel section is seven or more.

EXAMPLE

Hereinafter, an example specifically disclosing the laminated coil component of the present disclosure will be described. Note that the present disclosure is not limited only to the example below.

First Example

As the laminated coil component of a first example, the laminated coil component of the first embodiment was manufactured by a method below.

<Producing Process of Magnetic Material>

First, $Fe_2O_3$, ZnO, CuO, and NiO were weighed so as to have a predetermined ratio.

Next, these weighed materials, pure water, and the like were put in a ball mill together with PSZ media, mixed, and then pulverized. The mixing and pulverization time was set to six hours.

Then, the obtained pulverized material was dried and then pre-fired. The pre-firing temperature was set to 800° C. The pre-firing time was set to three hours.

In this way, a powdery magnetic material, more specifically, a powdery magnetic ferrite material was produced.

<Producing Process of Green Sheet>

First, a magnetic material, polyvinyl butyral-based resin as an organic binder, ethanol and toluene as organic solvents, and a plasticizer were put in a ball mill together with PSZ media, mixed, and then pulverized to produce slurry.

Next, the slurry was formed into a sheet by a doctor blade method and then punched to prepare a green sheet. The thickness of the green sheet was set to 25 μm. The shape of the green sheet was set to a rectangular shape.

<Formation Process of Conductor Pattern>

First, a predetermined portion of the green sheet was irradiated with a laser to form a via hole.

Next, Ag paste was applied to a surface of the green sheet while the via hole was filled with Ag paste by a screen printing method or the like. By the above, a conductor pattern for a coil conductor connected to a conductor pattern for a via conductor was formed on a surface of the green sheet while the conductor pattern for a via conductor is formed in the via hole. In this way, a coil sheet in which the conductor pattern for a coil conductor and the conductor pattern for a via conductor are formed on the green sheet was produced. A plurality of coil sheets were prepared, and a conductor pattern for a coil conductor corresponding to the coil conductor illustrated in FIGS. 2 and 3 and a conductor pattern for a via conductor corresponding to a via conductor (including the lead-out via conductor Sa1 illustrated in FIGS. 2 and 3) connected to the coil conductor illustrated in FIGS. 2 and 3 were formed for each coil sheet.

Further, Ag paste was applied to a surface of the green sheet while the via hole was filled with Ag paste by a screen printing method or the like. By the above, a conductor pattern for a land portion connected to a conductor pattern for a via conductor was formed on a surface of the green sheet while the conductor pattern for a via conductor was formed in the via hole. In this way, a via sheet in which the conductor pattern for a land portion and the conductor pattern for a via conductor are formed on the green sheet was produced separately from a coil sheet. A plurality of the via sheets were also prepared, and a conductor pattern for a land portion corresponding to the lead-out land portion constituting the lead-out conductor illustrated in FIGS. 2 and 3 and a conductor pattern for a via conductor corresponding to the lead-out via conductor (excluding the lead-out via conductor Sa1 illustrated in FIGS. 2 and 3) connected to the lead-out land portion illustrated in FIGS. 2 and 3 were formed on each of the via sheets.

<Producing Process of Laminate Block>

The coil sheet and the via sheet were laminated in the lamination direction (the length direction L in FIGS. 2 and 3) in the order corresponding to FIGS. 2 and 3, and then thermocompression-bonded to produce a laminate block.

<Producing Process of Element Body and Coil>

First, the laminated body block was cut into predetermined size with a dicer to produce a chip as an individual piece.

Next, the chip as an individual piece was fired. The firing temperature was set to 900° C. The firing time was set to three hours.

When the chip as an individual piece was fired, the green sheets of the coil sheet and the via sheet became insulating layers. As a result, an element body formed of a plurality of the insulating layers laminated in the lamination direction (the length direction L in FIGS. 2 and 3) was produced.

When the chip as an individual piece was fired, the conductor pattern for a coil conductor and the conductor pattern for a via conductor of the coil sheet became a coil conductor and a via conductor (including the lead-out via conductor Sa1 illustrated in FIGS. 2 and 3), respectively. As a result, a coil in which a plurality of the coil conductors laminated in the lamination direction (the length direction L in FIGS. 2 and 3) were electrically connected via the via conductor is produced.

As described above, the element body and the coil provided inside the element body were produced.

On the other hand, when the chip as an individual piece was fired, the conductor pattern for a land portion and the via conductor pattern of the via sheet became the lead-out land portion and the lead-out via conductor, respectively. As a result, the first lead-out conductor and the second lead-out conductor formed of a plurality of lead-out land portions and a plurality of lead-out via conductors laminated in the lamination direction (the length direction L in FIGS. 2 and 3) and connected alternately were produced. The first lead-out conductor was exposed from the first end surface of the element body. The second lead-out conductor was exposed from the second end surface of the element body.

Then, the element body was placed in a rotary barrel machine together with a medium, and the element body was subjected to barrel polishing so that a corner portion and a ridge portion are rounded.

<Forming Process of External Electrode>

First, by applying conductive paste containing Ag and glass frit, a first coating film connected to the first lead-out conductor exposed from the first end surface of the element body was formed so as to extend from the first end surface of the element body over a part of each of the first main surface, the second main surface, the first side surface, and the second side surface.

Further, by applying conductive paste containing Ag and glass frit, a second coating film connected to the second lead-out conductor exposed from the second end surface of the element body was formed so as to extend from the second end surface of the element body over a part of each of the first main surface, the second main surface, the first side surface, and the second side surface.

In this way, the first coating film and the second coating film were formed at positions separated from each other on a surface of the element body.

Next, by baking the first coating film, a first base electrode extending from the first end surface of the element body over a part of each of the first main surface, the second main surface, the first side surface, and the second side surface and connected to the first lead-out conductor was formed.

Further, by baking the second coating film, a second base electrode extending from the second end surface of the element body over a part of each of the first main surface, the second main surface, the first side surface, and the second side surface and connected to the second lead-out conductor was formed.

The baking temperature of the first coating film and the second coating film was set to 800° C.

The thickness of the first base electrode and the second base electrode was set to 5 μm.

Then, a Ni plated electrode and a Sn plated electrode were formed in order on a surface of the first base electrode by electrolytic plating. By the above, the first external electrode including the first base electrode, the Ni plated electrode, and the Sn plated electrode in order from the surface side of the element body was formed.

Further, a Ni plated electrode and a Sn plated electrode were formed in order on a surface of the second base electrode by electrolytic plating. By the above, the second external electrode including the second base electrode, the Ni plated electrode, and the Sn plated electrode in order from the surface side of the element body was formed.

In this way, the first external electrode electrically connected to the coil via the first lead-out conductor and the second external electrode electrically connected to the coil via the second lead-out conductor were formed on a surface of the element body.

As described above, the laminated coil component of the first example was manufactured.

The laminated coil component of the first example had a dimension of 2.0 mm in the length direction, a dimension of 1.25 mm in the height direction, and a dimension of 1.25 mm in the width direction.

First Comparative Example

As the laminated coil component of a first comparative example, the laminated coil component in which a region in which no coil conductor is present exists for three layers in terms of insulating layers between the first parallel section and the second parallel section as viewed from the lamination direction was manufactured. The laminated coil component of the first comparative example was manufactured in the same manner as the laminated coil component of the first example except that, in the <Formation process of conductor pattern> and the <Producing process of laminate block>, units configured such that three coil sheets, on which a conductor pattern for a coil conductor having the same shape as that of the coil conductor Q3 illustrated in FIGS. 2 and 3 was formed, were continuously laminated so that the entire conductor patterns for a coil conductor formed on the coil sheets overlap each other when viewed from the lamination direction constitute a parallel section were laminated for five units while the conductor patterns for a coil conductor were rotated clockwise by 90°.

[Evaluation]

First, the periphery of each of the laminated coil component of the first example and the laminated coil component of the first comparative example was sealed with resin in a state where the second main surface of the element body was erected vertically so as to be exposed to the upper side. Then, while each of the laminated coil components was polished by a polishing machine from the second main surface side toward the first main surface side of the element body to a substantially central portion in the height direction, the presence or absence of occurrence of a crack in the element body in a cross section along the length direction and the width direction was sequentially observed with a digital microscope.

In the laminated coil component of the first example in which the region where no coil conductor is present existed for only one layer in terms of an insulating layer between the first parallel section and the second parallel section when viewed from the lamination direction, no crack was generated in the element body.

On the other hand, in the laminated coil component of the first comparative example in which the region where no coil conductor is present existed for three layers in terms of insulating layers between the first parallel section and the second parallel section when viewed from the lamination direction, a crack was generated in the element body.

What is claimed is:

1. A laminated coil component comprising:

an element body including a plurality of insulating layers laminated in a lamination direction;

a coil inside the element body; and an external electrode on a surface of the element body and electrically connected to the coil, wherein the coil includes a plurality of coil conductors laminated in the lamination direction electrically connected via a via conductor penetrating the insulating layer in the lamination direction, the plurality of coil conductors laminated in the lamination direction includes a first laminated portion including three or more of the coil conductors adjacent to each other, a second laminated portion including the coil conductors adjacent to each other such that a number of the coil conductors in the second laminated portion is the same as a number of the coil conductors in the first laminated portion, and an intermediate portion between both of the laminated portions, and adjacent to both of the first laminated portion and the second laminated portion, and including one or two of the coil conductors, the first laminated portion has first parallel sections in which all the coil conductors constituting the first laminated portion overlap each other when viewed from the laminated direction, the first parallel sections are connected in parallel by the via conductor, the second laminated portion has second parallel sections in which all the coil conductors constituting the second laminated portion overlap each other when viewed from the laminated direction, the second parallel sections are connected in parallel by the via conductor, the first parallel sections and the second parallel sections overlap each other when viewed from the lamination direction, and all the coil conductors of the intermediate portion do not overlap each part of the first parallel sections and the second parallel sections when viewed from the laminated direction.

2. The laminated coil component according to claim 1, wherein the intermediate portion includes one of the coil conductors.

3. The laminated coil component according to claim 1, wherein the lamination direction and a direction of a coil axis of the coil are along a same direction and are parallel to a mounting surface of the element body.

4. The laminated coil component according to claim 1, wherein a length of all the coil conductors of the first laminated portion, the second laminated portion, and the intermediate portion is a length of ¾ turns of the coil.

5. The laminated coil component according to claim 2, wherein the lamination direction and a direction of a coil axis of the coil are along a same direction and are parallel to a mounting surface of the element body.

6. The laminated coil component according to claim 2, wherein a length of all the coil conductors of the first laminated portion, the second laminated portion, and the intermediate portion is a length of ¾ turns of the coil.

7. The laminated coil component according to claim 3, wherein a length of all the coil conductors of the first laminated portion, the second laminated portion, and the intermediate portion is a length of ¾ turns of the coil.

8. The laminated coil component according to claim 5, wherein a length of all the coil conductors of the first laminated portion, the second laminated portion, and the intermediate portion is a length of ¾ turns of the coil.

* * * * *